US009367911B2

(12) United States Patent
Dalla-Torre et al.

(10) Patent No.: US 9,367,911 B2
(45) Date of Patent: Jun. 14, 2016

(54) APPARATUS AND METHOD FOR DEFECT DETECTION INCLUDING PATCH-TO-PATCH COMPARISONS

(75) Inventors: Michele Dalla-Torre, Givataim (IL); Boris Sherman, Rehovot (IL); Zion Hadad, Ashkelon (IL); Yehuda Udy Danino, Bnei Brak (IL); Noga Bullkich, Nahariya (IL)

(73) Assignee: APPLIED MATERIALS ISRAEL, LTD., Rehovot (IL)

(*) Notice: Subject to any disclaimer, the term of this patent is extended or adjusted under 35 U.S.C. 154(b) by 490 days.

(21) Appl. No.: 13/495,824

(22) Filed: Jun. 13, 2012

(65) Prior Publication Data

US 2013/0336573 A1 Dec. 19, 2013

(51) Int. Cl.
*G06K 9/00* (2006.01)
*G06T 7/00* (2006.01)

(52) U.S. Cl.
CPC ....... *G06T 7/001* (2013.01); *G06T 2207/30141* (2013.01); *G06T 2207/30148* (2013.01)

(58) Field of Classification Search
CPC .......... G06T 2207/30148; G06T 7/0004; G06T 7/0081; H01J 2237/2817; G03F 1/84; G03F 7/7065; G03F 7/70666; G01N 21/95607; G01N 21/9501; G01N 2021/95615
See application file for complete search history.

(56) References Cited

U.S. PATENT DOCUMENTS

| 6,727,512 | B2 * | 4/2004 | Stokowski et al. ...... 250/559.45 |
| 7,009,695 | B2 * | 3/2006 | Some .......................... 356/237.1 |
| 7,254,263 | B2 * | 8/2007 | Ine ................................. 382/145 |
| 7,684,609 | B1 * | 3/2010 | Toth et al. ..................... 382/141 |
| 2007/0081154 | A1 * | 4/2007 | Mapoles et al. ........... 356/237.5 |
| 2008/0250384 | A1 * | 10/2008 | Duffy et al. ..................... 716/21 |
| 2013/0236084 | A1 * | 9/2013 | Li et al. .......................... 382/144 |

* cited by examiner

*Primary Examiner* — Chan Park
*Assistant Examiner* — Elisa Rice
(74) *Attorney, Agent, or Firm* — Lowenstein Sandler LLP

(57) ABSTRACT

A system receives, based on processing of an inspected frame of an inspected image generated by collecting signals indicative of a pattern on an article, at least one candidate defect location in the inspected frame. The system defines a candidate patch within the inspected frame. The candidate patch is associated with the candidate defect location. The system identifies at least one similar patch in the inspected frame using a predefined similarity criterion and determines whether a defect exists at the candidate defect location based on a comparison of at least a portion of the candidate patch with at least a corresponding portion of the at least one similar patch.

20 Claims, 23 Drawing Sheets

APPARATUS AND METHOD FOR DEFECT DETECTION INCLUDING PATCH-TO-PATCH COMPARISONS

FIELD OF THE INVENTION

The present invention relates generally to analysis of microscopic patterned objects or articles and more particularly to inspecting the surface of an article for defects and detection of defects.

BACKGROUND OF THE INVENTION

A common problem of defect detection is distinguishing between defects and noise. Typically, detection of defects on semiconductor masks, reticles and wafers is done by comparing an image of a portion of an article (e.g., mask, reticle or wafer) with a reference image. In a Die-to-Model method, the presence or absence of a defect in a location is checked by comparing the pattern at the desired location at an inspected die with the pattern of the same location in a model, prepared based on, for example, die design data or a model of inspected die/s. In the Die-to-Die method, the presence or absence of a defect in a location is checked by comparing the pattern at the desired location at an inspected die with the pattern of the same location in an identical die, for example, a previously inspected die on the same mask or wafer (Inter-Die comparison). Since probability of having same defect in the same location on two different dies is practically close to zero, significant dissimilarities between two dies are considered defects.

Typically, in the Inter-Die comparison method, the data to be compared is collected at two spaced apart locations—each located at a different die. While the two locations—in the inspected die and reference die, correspond to the same pattern, each is subjected to different variations, for example, process variations, mechanical and electrical variations. Such variations impose noise, for example, in a Difference image ("Diff"), which is an image created by, for example, subtracting the inspected image from the reference image. This noise should be considered and disregarded; otherwise detection sensitivity and integrity are hindered. This challenge increases as the design rules shrinks.

There is a need for sensitive and accurate die-to-die defect detection techniques.

SUMMARY OF THE INVENTION

Certain embodiments of the present invention are particularly useful for inspecting patterned semiconductor wafers, masks and reticles used in producing integrated-circuit dies or chips, and embodiments of the invention are therefore described below particularly with respect to this application.

Certain embodiments of the present invention seek to provide a solution to the problem of defect detection of distinguishing between defects and noise. Detection is carried out by comparing microscopic object locations to references which differ from the location that is being inspected, causing noise in the defect detection process. Intra-frame comparisons—in which frames of same die are compared—provide a more similar reference, reducing noise in the defect detection process. Certain embodiments of the present invention seek to provide, for Die-to-Die (D2D) applications, an intra-frame defect detection method, in which the noise is significantly lower than in inter-die detection (in which corresponding frames of different dies are compared), thereby significantly increasing sensitivity to allow better distinction between real defects and false alarms. In classic D2D detection, defect detection includes inter-frame comparisons of microscopic object locations which are relatively far away, relative to the scope or size of local differences, causing noise in the defect detection process. Intra-frame comparisons compare microscopic object locations which are closer together, reducing noise in the defect detection process.

A particular advantage of intra-(within) frame detection i.e. defect detection based on comparison of similar (but for defects) locations within a single frame, is that noise is significantly lower than inter (between)-die detection in which a large distance, corresponding to the size of a die, separates locations being compared such that local effects (e.g., focus variations and distortions, registration errors, process variations, mechanical and electrical variations) constitute significant noise in relation to the goal of determining defects by effecting comparisons.

In a typical inter-die defect detection, distances between locations being compared may be approximately 5 cm (e.g., for a 10 cm×10 cm mask having 2 dies per mask) as opposed to intra-frame detection, for example, as shown and described herein in which distances between locations being compared may be as small as only a few microns. Thus, systematic errors which are accumulated during D2D detected are compensated, giving rise to improved detection sensitivity.

Certain embodiments of the present invention seek to provide, for Die-to-Model (D2M) applications, a defect detection method in which, instead of comparing an image to the model, the image is compared to itself, for example, a patch in the image to another patch in the same image, thereby to provide far superior sensitivity, since the model often suffers from modeling problems, for example, in that it differs greatly from the image. This has the effect of significantly increasing sensitivity results, relative to conventional D2M in which the image and the model often differ significantly such that comparing the two may yield extremely poor sensitivity.

Certain embodiments of the present invention seek to provide, for a defect detection method facilitating very sensitive detection, for scenarios where no reference is available, including creating a new reference from other patches in the image being inspected. For applications, for example, mask inspection applications, in which the inspected image is created by collecting signals reflected by the mask and signals transmitted by the mask in response to illuminating the mask with, for example, a laser, embodiments can create images for comparisons using transmitted-light and reflected-light imaging.

There is thus provided, in accordance with at least one embodiment of the present invention, a method for finding defects in microscopic objects, the method comprising receiving, based on processing of an inspected frame of an inspected image generated by collecting signals indicative of a pattern on an article, at least one candidate defect location in the inspected frame; defining a candidate patch within the inspected frame, the candidate patch being associated with the candidate defect location; identifying at least one similar patch in the inspected frame using a predefined similarity criterion; and determining whether a defect exists at the candidate defect location based on a comparison of at least a portion of the candidate patch with at least a corresponding portion of the at least one similar patch.

BRIEF DESCRIPTION OF THE DRAWINGS

Various embodiments of the present disclosure will be understood more fully from the detailed description given

DETAILED DESCRIPTION OF CERTAIN EMBODIMENTS

Figure 1:
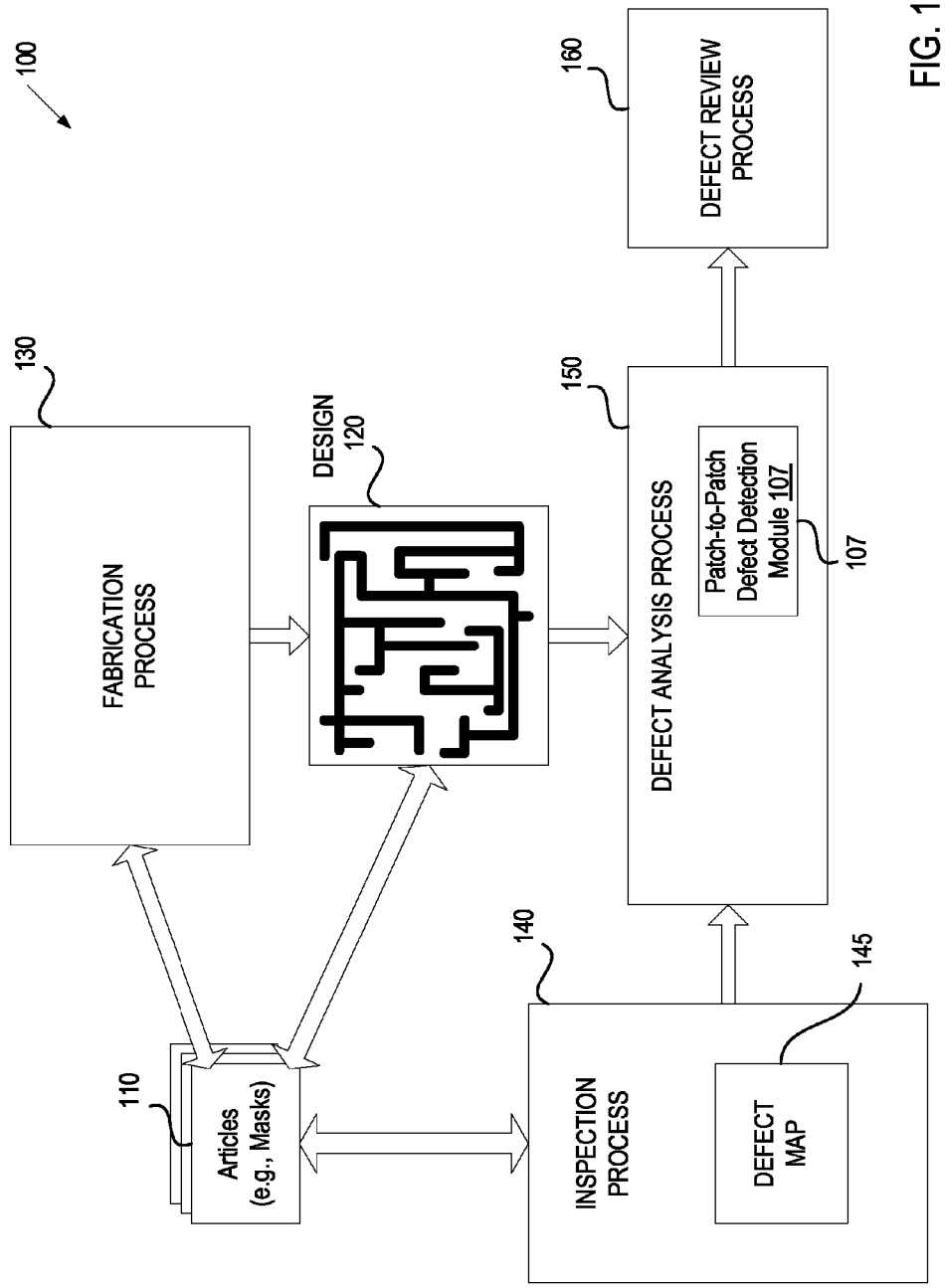
FIG. 1 is a block diagram illustrating a production environment, according to some embodiments.

The following terms may be construed either in accordance with any definition thereof appearing in the prior art literature or in accordance with the specification, or as follows:

Light-based Imaging Defect Detection—transmitted-light and reflected-light imaging defect detection; a variant of defect detection for microscopic objects, in which comparisons are made between an image of the transmitted light (Tx) and another image of the reflected light (Rf). The defect may be seen on either or both of the Tx and the Rf images, and no "clean" reference is available indicating what the pattern should look like.

Microscopic objects: includes but is not limited to patterned objects such as reticles, photo masks and wafers.

"Die to die" (D2D)—Defect detection mode in which inter-die comparisons, between identical dies, are used to detect defects by using previously inspected die as a "reference" for a newly inspected die.

"Die-to-Model" (D2M)—Defect detection mode, a variant of defect detection for microscopic objects, in which instead of having a reference image from the adjacent die, an artificially created defect-free reference image, called a Model, is used. Defect detection is then based on comparisons of dies to the model.

Frame—a portion of an image of a microscopic object imaged by a suitable inspection system such as but not limited to AMAT's UVision™ Wafer Inspection System or AMAT's AERA™ Mask Inspection System, all commercially available from Applied Materials, Inc., Applied Materials, Inc. 3050 Bowers Avenue, P.O. Box 58039, Santa Clara, Calif. 95054-3299, U.S.A.

Intra-frame—typically includes comparing regions in a certain frame to regions within the same frame, such as but not limited to the patch-to-patch methods shown and described herein.

Irregular events—pixels that have a high (absolute) difference signal, which are typically detected by applying a threshold to a difference signal.

Patch—a portion of an image. The invention is suitable for images having repetitive pattern structures. A patch includes at least one pattern structure that appears in other patches of the same image. The repeating pattern structures need not be periodic. For ease of explanation the invention will be illustrated herein with reference to a patch having a rectangular shape, comprising 5×5 pixels or 10×5 pixels but the invention is not limited thereto and a patch can be defined in many shapes and sizes.

The term "inspection" is used broadly in the present patent application to refers to any sort of data capture that can provide information useful in detecting defects, whether the data are captured over the entire mask or wafer or in individual suspect locations. The invention is applicable for the analysis of candidate defects identified by an inspection system that scans the wafer or mask and provide a list of locations of suspected defects. The invention is also applicable for the analysis of candidate defects which are re-detected by a review tool (or a review unit of a combined inspection and review tool) based on locations of suspected defects which were provided by an inspection tool.

FIG. 1 illustrates an exemplary workflow for semiconductor design and fabrication, in accordance with embodiments of the present invention. As illustrated, articles 110 may be produced in accordance with a design 120, via a fabrication process 130 controlled by a set of process parameters 135. Examples of an article 110 can include, and is not limited to, a patterned semiconductor wafer, a mask, and a reticle to produce integrated-circuit dies and/or chips. For brevity and simplicity, a mask is used as an example of an article 110 throughout this document. These process parameters may include a wide variety of parameters, for example, lithography parameters, etch parameters, and any other type of parameters.

Due to a variety of factors, the structures formed (e.g., in separate dice) in the masks 110 may not exactly match the design 120. To determine how the actual masks 110 vary from the design 120, one or more of the masks 110 undergo an inspection process 140. The inspection process 140 may be performed using any suitable type defect inspection system, such as an optical or E-Beam inspection system. An example of an optical inspection system is the Aera™ inspection system available from Applied Materials® of Santa Clara, Calif. While shown as a separate process in FIG. 1, the inspection process 140 may, in some cases, be performed inline with the fabrication process 130.

As part of the inspection process 140, a defect map 145 identifying locations of defects in the masks 110 may be generated. The defects indicated in the map 145 may be, for example, locations of particles or of irregular characteristics of elements. As illustrated, inspection results (e.g., captured in the defect map) may be correlated with the design 120 via a defect analysis process 150, for example, by using the defect map 145 and a computer automated design (CAD) model of the design 120, for example, in a graphics from (such as GDS, GDS-II, and the like). As a result, defects from the map 145 may be effectively located with the elements on which they occur. The defect analysis process 150 may include a patch-to-patch defect detection module 107 to detect defects by comparing patches within an image.

As illustrated, embodiments of the present invention may provide an automated defect review process 160. The automated defect review process 160 may process a relatively large amount of defect data in an effort to extract information that may be used to gain insight into design process interaction (DPI), that is, the sensitivity of particular designs to process variations.

Figure 2:
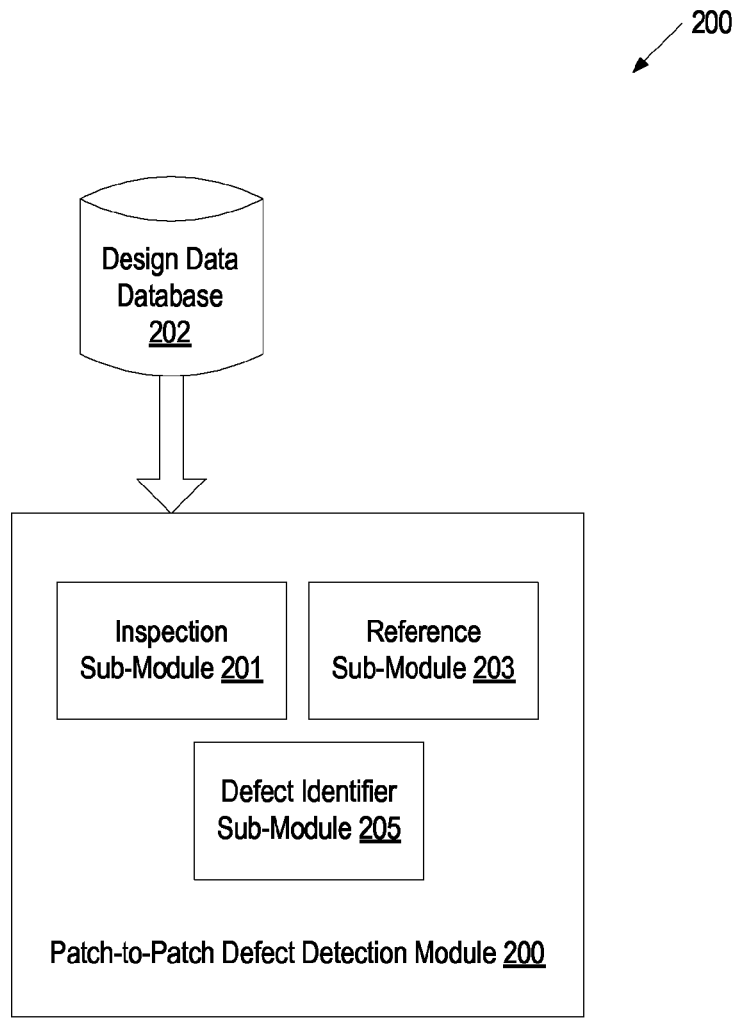
FIG. 2 is a block diagram of one embodiment of a patch-to-patch defect detection module.

FIG. 2 is a block diagram of one embodiment of a patch-to-patch defect detection module 200. The patch-to-patch defect detection module 200 may be the same as the patch-to-patch defect detection module 107 in FIG. 1. The patch-to-patch defect detection module 200 includes an inspection sub-module 201, a reference sub-module 203, and a defect identifier sub-module 205. Note that in alternative embodiments, the functionality of the inspection sub-module 201, the reference sub-module 203, and the defect identifier sub-module 205 may be combined or further divided.

The inspection sub-module 201 can identify a candidate defect location in an inspected frame of an inspected image. One embodiment of an inspected frame in an inspected image is described in greater detail below in conjunction with FIG. 3. The inspection sub-module 201 can define a candidate patch based on the candidate defect location. For example, the inspection sub-module 201 can select a shape of the candidate patch, select a size of a dimension of the candidate patch, select an area of the candidate patch, and/or adjust a location to which the candidate patch is associated to define the candidate patch.

The inspection sub-module 201 can identify at least one similar patch in the inspected frame using a predefined similarity criterion. Examples of the predefined similarity criterion can includes, and are not limited to, a predefined threshold of an absolute gray-level difference, an absolute signal-to-noise ratio, and a normalized correlation. One embodiment of identifying at least one similar patch is described in greater detail below in conjunction with FIG. 3. One embodiment of identifying at least one similar patch in the inspected frame based on a reference frame is described in greater detail below in conjunction with FIG. 4. In one embodiment, the inspection sub-module 201 identifies one or more patches using a statistical model.

The defect identifier sub-module 205 can determine whether a defect exists at the candidate defect location in the frame based on a comparison of at least a portion of the candidate patch in the inspected frame with at least a corresponding portion of the at least one similar patch in the inspected frame. The defect identifier sub-module 205 can determine a difference between the candidate patch and the similar patch. The defect identifier sub-module 205 can compare the difference to a threshold and can identify the candidate defect location in the inspected frame has a defect if the difference satisfies the threshold.

In one embodiment, the inspection sub-module 201 identifies at least one similar patch in the inspected frame based on a reference frame in a reference image. The reference sub-module 205 can receive a reference frame of a reference image. In one embodiment, the reference frame is a frame in another die that has a similar die location as the inspected frame. In another embodiment, the reference frame is an artificially created model of the inspected frame using design data.

In one embodiment, the reference sub-module 203 creates a reference frame by creating a model of the inspected frame using design data stored in a design data database 202. In one embodiment, the reference sub-module 203 is coupled to a design data database 202. As earlier noted, an article (e.g., mask) may be produced according to an article design (e.g., mask design) via a fabrication process controlled by a set of process parameters. Mask design data may be stored in a design data database 202. The design data database 202 may store design data such as the design layout, the routing information for the design layout, etc. In one embodiment, the design data may be in the form of a computer automated design (CAD) model of the design, for example, in a graphics form (such as GDS, GDS-II, and the like). The design data database 202 may also store historical design data for previously designed masks.

The reference sub-module 203 can define a first reference patch within the reference frame. The first reference patch corresponds to the candidate patch in the inspected frame. The reference sub-module 203 can identify a first reference location in the first reference patch. The first reference location corresponds to the candidate defect location in the inspected frame. The reference sub-module 203 can select at least one second reference patch of the reference image within the reference frame using a reference similarity criterion. Examples of the similarity criterion can include, and are not limited to, a predefined threshold of an absolute gray-level difference, an absolute signal-to-noise ratio, and a normalized correlation. The reference sub-module 203 can associate a second reference location to the second reference patch based on the association of the first reference location to the first reference patch. For example, in the case of a square-shape patch or a rectangular shape patch, the reference sub-module 203 can select the center point of the patch, or one of the corners of the patch (e.g., lowest x,y values with respect to X,Y axis originated at one corners of the dies) to associate a second reference location to the second reference patch.

The inspection sub-module 201 can associate the second reference location in the reference frame with a corresponding second location in the inspected frame and identify a patch associated with the second location in the inspected frame as the patch that is similar to the candidate patch in the inspected frame. For example, the identification sub-module 201 can select a location within the second reference patch and locate a corresponding location in the inspected image. For example, in the case of a square-shape patch or a rectangular shape patch, the identification sub-module 201 can select the center point of the second reference patch, or one of the corners of the second reference patch. The identification sub-module 201 can locate a similar patch in the inspected image based on the corresponding location in the inspected image.

Figure 3:
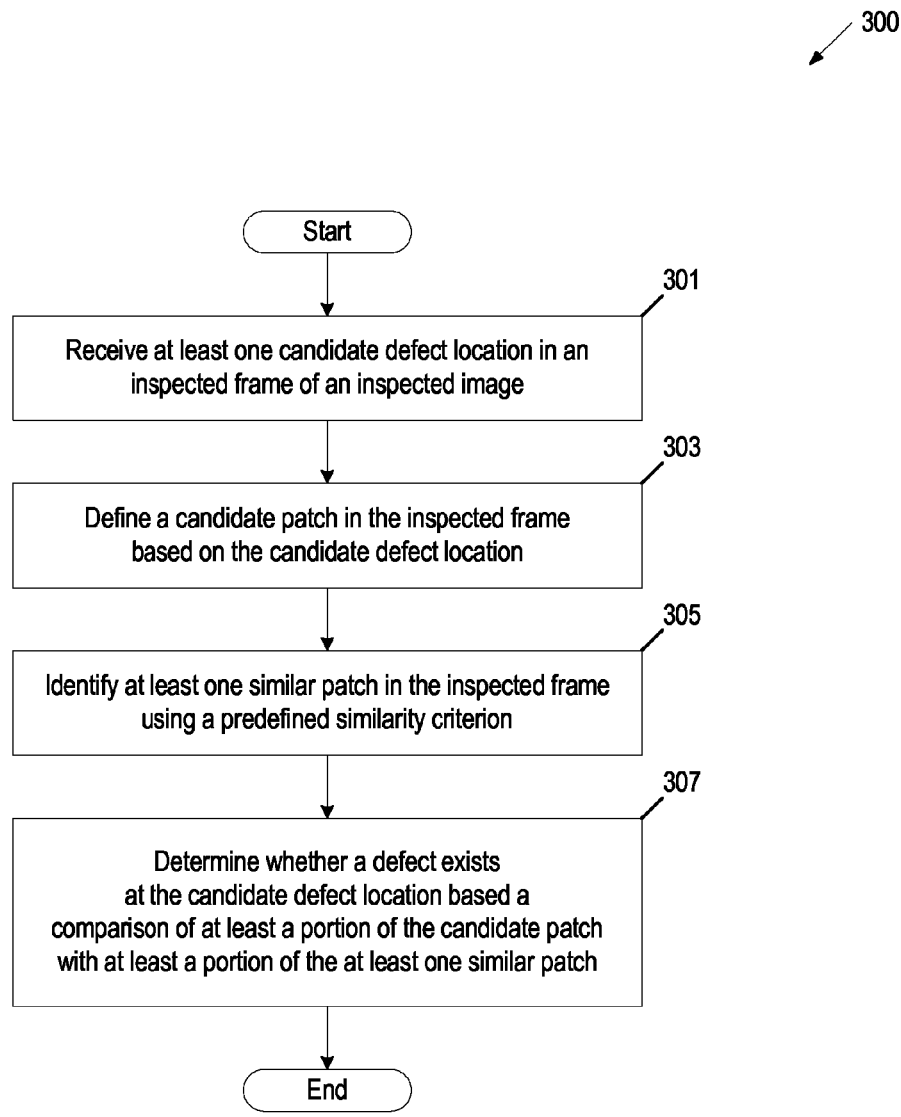
FIG. 3 is a flow diagram of an embodiment of a method for detecting defects by comparing patches within an image.

FIG. 3 is a flow diagram of an embodiment of a method 300 for detecting defects by comparing patches within an image. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a patch-to-patch defect detection module 107 of FIG. 1.

At block 301, processing logic receives at least one candidate defect location in an inspected frame. The candidate defect location can be received from processing the inspected frame. The inspected frame can be a frame of an inspected image that is generated by collecting signals indicative of a pattern on an article. Examples of an article can include, and are not limited to, a patterned semiconductor wafer, a mask, and a reticle to produce integrated-circuit dies and/or chips. In one embodiment, the signals are caused by illuminating the article (e.g., mask) with a coherent light. In another embodiment, the signals are caused by directing a charged particle beam toward the article (e.g., mask). Examples of an inspected image can include, and are not limited to, a reflected inspected image and a transmitted inspected image. Processing logic can collect signals reflected from the mask to create a reflected inspected image. Processing logic can collect signals transmitted through the mask to create a transmitted inspected image. The inspected image can also be created by collecting signals returning from the mask in response to illuminating the mask by, for example, a coherent light or by charged particles.

At block 303, for each candidate defect location, processing logic defines a candidate patch in the inspected frame based on the candidate defect location. For example, for each candidate defect location, processing logic can open a candidate patch around the corresponding candidate defect location. Processing logic can select a shape of the candidate patch, select a size of a dimension of the candidate patch, select an area of the candidate patch, and/or adjust a location to which the candidate patch is associated to define the candidate patch.

At block 305, processing logic identifies at least one similar patch in the inspected frame using a predefined similarity criterion. Examples of the predefined similarity criterion can include, and are not limited to, a predefined threshold of an absolute gray-level difference, an absolute signal-to-noise ratio, and a normalized correlation. Processing logic can identify at least one similar patch by comparing pixels between the candidate patch in the inspected frame and the similar patch in the inspected frame. Processing logic can identify at least one similar patch by excluding one or more pixels in a comparison between the candidate patch in the inspected frame and the similar patch in the inspected frame. The one or more pixels can be associated with the candidate defect location. In one embodiment, processing logic identifies at least one similar patch in the inspected frame using a reference frame. One embodiment of identifying at least one similar patch in the inspected frame based on a reference frame is described in greater detail below in conjunction with FIG. 4. In one embodiment, processing logic identifies one or more patches in the inspected frame using a statistical model. In one embodiment, processing logic changes the location of each similar patch in the inspected frame in relation to the candidate defect location and/or changing a dimension of the similar patch and/or the shape of the similar patch, so as to increase the similar patch's similarity to the candidate patch. In one embodiment, processing logic aligns each similar patch in the inspected image to the candidate patch and optionally, applies an optimal filter to the similar patch in order to enhance the similarity, but for defects, of the similar and candidate patches.

At block 307, processing logic determines whether a defect exists at the candidate defect location based on a comparison of at least a portion of the candidate patch with at least a corresponding portion of the at least one similar patch. Processing logic can determine a difference between the candidate patch and the similar patch. Processing logic can compare the difference to a threshold and can identify the candidate defect location has a defect if the difference satisfies the threshold.

In one embodiment, once the similar patch has been aligned and optionally filtered, processing logic compares the similar patch to the candidate patch and determines whether the candidate patch has a defect or does not have a defect at the candidate defect location, accordingly. If more than one similar patch is found for the candidate patch, processing logic can make the determination of whether the candidate patch has a defect or does not have a defect based on a suitable combination, for example, of averaging of results of comparing each of the various similar patches to the candidate patch.

In one example, processing logic determines that a defect exists at the candidate defect location if a defect exists at the candidate defect location in the reflected inspected image and/or the transmitted inspected image.

Figure 4:
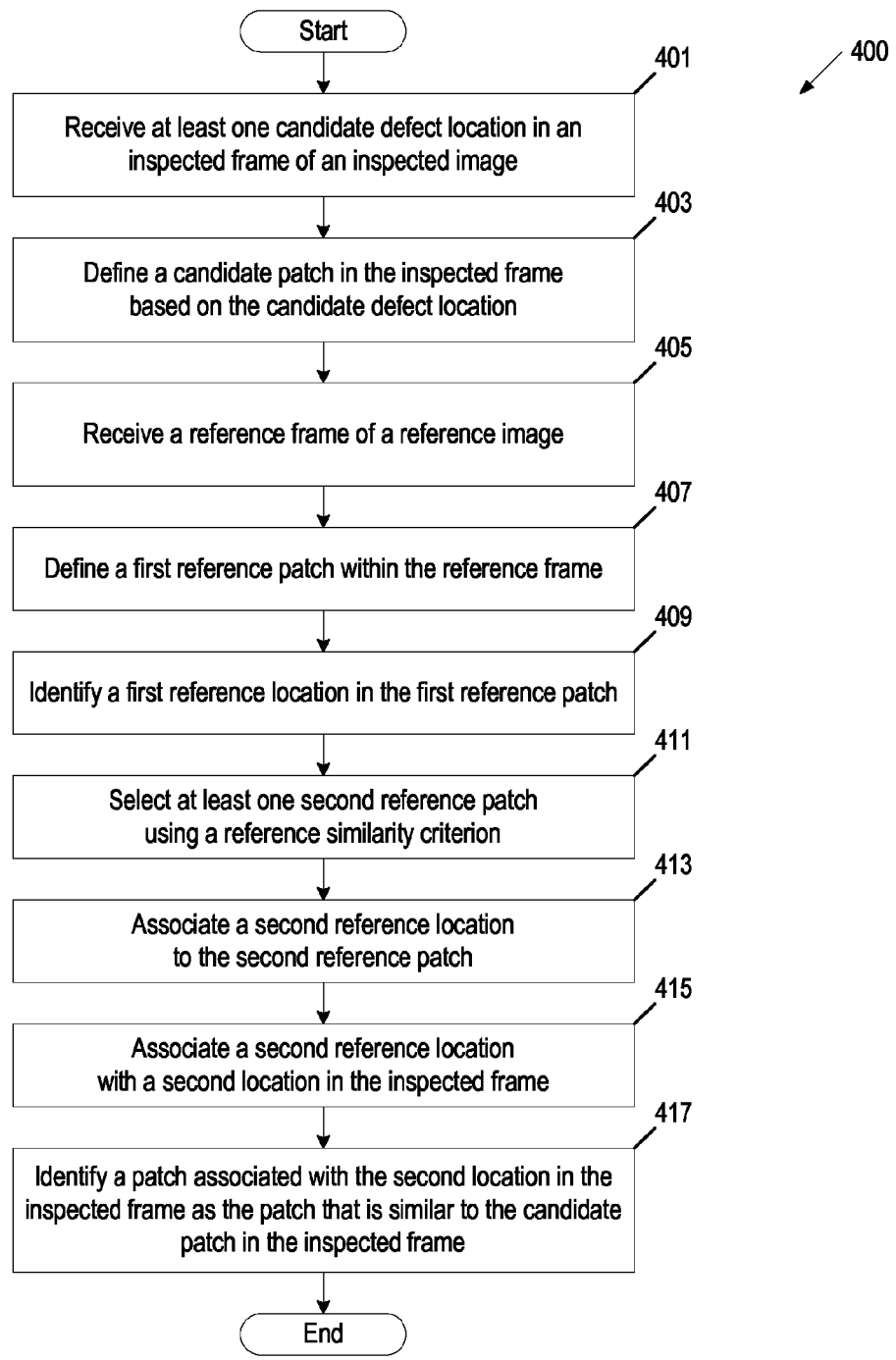
FIG. 4 is a flow diagram of an embodiment of a method for identifying at least one similar patch in an inspected frame using a reference frame.

FIG. 4 is a flow diagram of an embodiment of a method 400 for identifying at least one similar patch in an inspected frame using a reference frame. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a patch-to-patch defect detection module 107 of FIG. 1.

At block 401, processing logic receives at least one candidate defect location in an inspected frame. At block 403, processing logic defines a candidate patch in the inspected frame based on the candidate defect location. For example, processing logic opens a patch around a candidate defect location. Processing logic can select a shape of the candidate patch, select a size of a dimension of the candidate patch, select an area of the candidate patch, and/or adjust a location to which the candidate patch is associated to define the candidate patch.

At block 405, processing logic receives a reference frame of a reference image. In one embodiment, the reference frame is a frame in another die that has a similar die location as the inspected frame. In another embodiment, processing logic creates the reference frame by creating a model of the inspected frame using design data. At block 407, processing logic defines a first reference patch within the reference frame. The first reference patch corresponds to the candidate patch in the inspected frame. At block 409, processing logic identifies a first reference location in the first reference patch.

The first reference location corresponds to the candidate defect location in the inspected frame.

At block 411, processing logic selects at least one second reference patch of the reference image within the reference frame. Processing logic can use a reference similarity criterion. Examples of the similarity criterion can include, and are not limited to, a predefined threshold of an absolute gray-level difference, an absolute signal-to-noise ratio, and a normalized correlation. At block 413, processing logic associates a second reference location to the second reference patch based on the association of the first reference location to the first reference patch. For example, in the case of a square-shape patch or a rectangular shape patch, processing logic can select the center point of the second reference patch as the second reference location. In another example, processing logic can select one of the corners of the second reference patch (e.g., lowest x,y values with respect to X,Y axis originated at one corners of the dies) as the second reference location.

At block 415, processing logic associates the second reference location with a corresponding second location in the inspected frame and identifies a patch associated with the second location in the inspected frame as the patch that is similar to the candidate patch in the inspected frame at block 417. For example, in the case of a square-shape patch or a rectangular shape patch, the second reference location may be the center point or a corner of the second reference patch, and processing logic may locate the corresponding location in the inspected image. Processing logic then identifies a patch associated with corresponding location. The patch that is associated with the corresponding location becomes the similar patch of the candidate patch in the inspected image.

Figure 5:
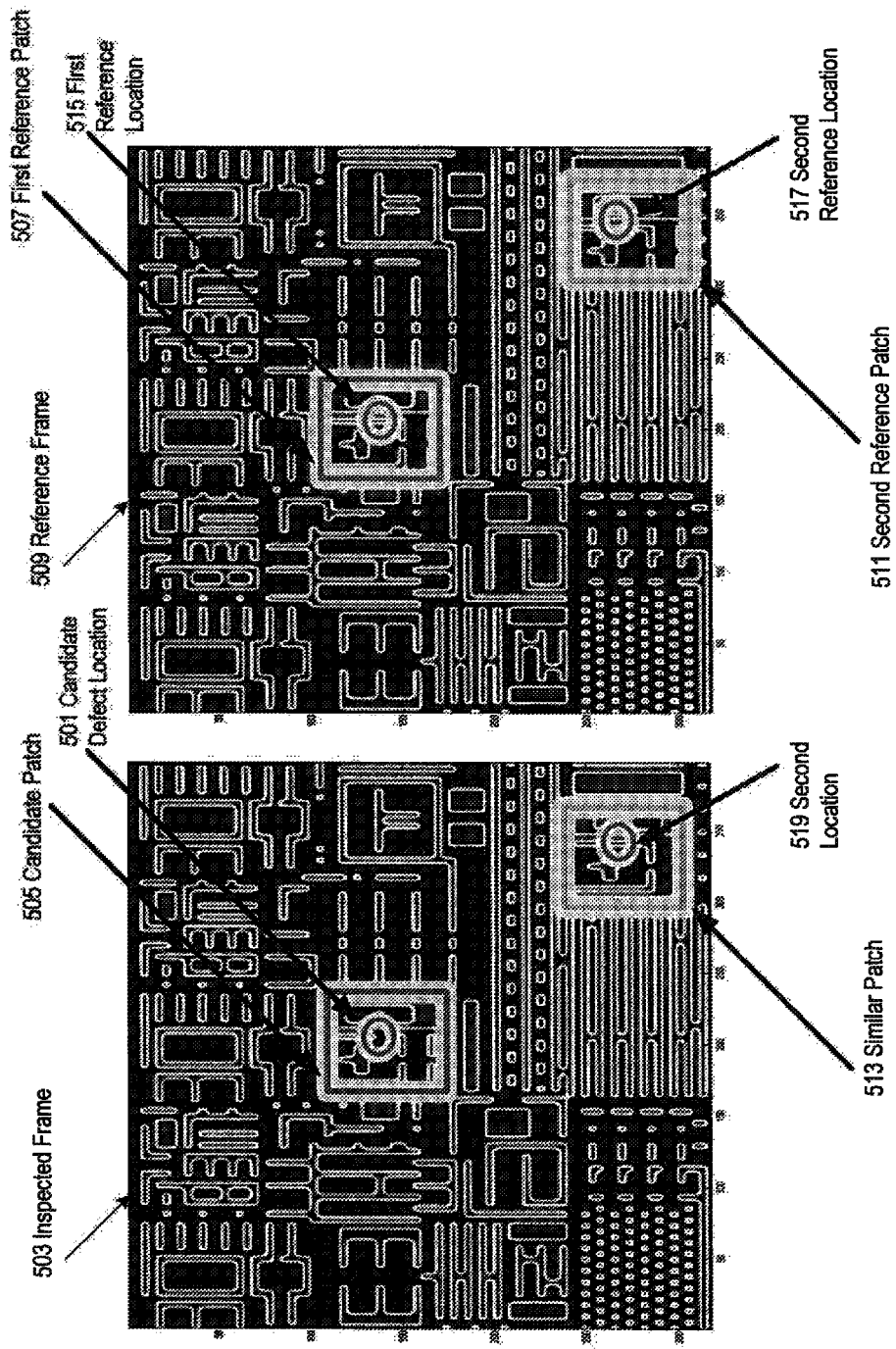
FIG. 5 illustrates exemplary patches in exemplary frames in exemplary images, according to some embodiments.

FIG. 5 illustrates exemplary patches in exemplary frames in exemplary images, according to some embodiments. A candidate defect location 501 is identified in an inspected frame 503 of an inspected image. A candidate patch 505 is defined based on the candidate defect location 501. A first reference patch 507 is defined within a reference frame 509. The first reference patch 507 corresponds to the candidate patch 505 in the inspected frame 503. A first reference location 515 is identified in the first reference patch 507. The first reference location 515 corresponds to the candidate defect location 501 in the inspected frame 503. At least one second reference patch 511 is selected of the reference image within the reference frame 509. A second reference location 517 is associated to the second reference patch 511 based on the association of the first reference location to the first reference patch. The second reference location 517 is associated with a corresponding second location 519 in the inspected frame 503. A patch 513 is associated with the second location 519 in the inspected frame 503 as the patch that is similar to the candidate patch 505 in the inspected frame 503.

A particular advantage of certain embodiments is that defect detection can take advantage of non-periodic repetition which, it turns out, occurs frequently in many mass-manufactured microscopic objects. For example, vicinities of "contacts" may be similar hence repetitious since many contacts may be present even in a 100×100 pixel array.

Defects may be found by comparing non-periodic but repeating patterns. This is typically more satisfactory than restricting the basis for defect detection to comparisons of periodic repeating patterns. Chip design has been found to frequently contain non-periodic patterns, which cannot be covered using detection that is based on an assumption of periodicity.

Another advantage of certain embodiments is that repeating ("similar") areas which can be used as a basis for comparison to a candidate defect are found without reliance on known periodicity. Instead, analysis of the areas itself allows repetitions to be identified, even by an exhaustive search of all possible translations of a particular area onto other similarly sized areas within the same frame. Some masks may be entirely lacking in periodicity, but may still have typically intra-frame repetitions on which defect detection may be based.

Optionally, the article to be inspected is selected from among the set of: wafers, masks and reticles, and wherein the method also comprises performing at least one automated process which differentiates between microscopic objects for which the defects were found by the comparisons and microscopic objects for which the defects were not found by the comparisons. The automated process may for example include automated packing of "good" (e.g., defectless or almost defectless objects) and discarding of "bad" objects having none or more than a certain level of defects. More generally, the automated process may for example include any variety of automatic sorting of objects into groups depending on results of comparing to facilitate differential automated handling or differential automated distribution of the groups.

Optionally, in order to determine whether the similar patch is similar to the candidate patch, a portion of the candidate patch is compared to the corresponding portion of the similar patch, the corresponding portion not including at least a portion of the candidate defect. For example, selected pixels at or near the candidate locations are excluded from the check of similarity. It is believed to be advantageous to avoid basing patch similarity determinations on comparisons of the portion of the patch which is believed to contain a defect to the corresponding portion of the similar patch. Instead, the vicinity of the believed defect location is used to make the similarity determination.

Optionally, if more than one similar patch is found by the searching, the comparing includes: comparing at least a portion of the candidate patch to at least a corresponding portion of each of the plurality of similar patches, thereby to obtain a plurality of comparison results, and averaging the plurality of comparison results to find defects.

A particular advantage of certain embodiments of the invention is the ability to find defects by averaging several comparison processes, thereby diminishing noise, rather than by relying on a single comparison process (e.g., as in conventional die-to-die). While it is sometimes theoretically possible to rely on more than one comparison process in die-to-die, this would involve comparisons between portions of the inspected object which are at least two dies away from one another, which is not advisable due to local effects which tend to cause disparate portions of an inspected object to be dissimilar even in the absence of defects. Also, many masks have only two dies such that it is not possible to average several comparison processes.

Optionally, the searching also comprises: adapting at least one characteristic of at least one first similar patch which has been found, thereby to define a more similar patch which corresponds to a modified candidate patch containing the candidate defect and whose similarity to the modified candidate patch exceeds the similarity between the first similar and first candidate patches, and wherein the comparing includes comparing at least a portion of the modified candidate patch to a corresponding portion of the similar patch.

Optionally, the characteristic comprises a length of at least one dimension of the first similar patch. Optionally, the characteristic comprises a relative positioning between the candidate defect and the candidate patch containing the candidate defect.

A particular advantage of adapting similar patch characteristics as above is that more similar patches may be found for a given similarity threshold such that it becomes more likely that the detection method will succeed in finding at least one similar patch for each candidate defect. An initial loose similarity criterion may be used to identify "nominees" i.e. first similar patches which are reasonably similar to the candidate defect location even if perhaps not sufficiently similar for defect detection purposes. Once these reasonably similar patches or "nominees" are found, one or more dimensions of each reasonably similar patch found may be varied so as to find a truly similar patch, i.e. a patch which is sufficiently similar for defect detection purposes. Alternatively or in addition, the location of the reasonably similar patch relative to the candidate defect may be varied so as to find a truly similar patch.

For example, a 50×50 pixel similar patch may be centered on a candidate defect location in an inspected frame and passes the initial similarity criterion. Subsequently, four different 40×40 pixel similar patches included within the inspected frame may be discovered to each pass a strict similarity threshold. Alternatively or in addition, three more 50×50 pixel similar patches which include the candidate defect location but are not centered thereon, may be found to also each pass the strict similarity threshold. For example, the three similar patches may include one similar patch that includes the candidate defect location at its upper right corner, one similar patch that includes the candidate defect location at its lower left corner, and one candidate patch that includes the candidate defect location approximately intermediate to its two lower corners. Each of the seven candidate patches may be compared to the candidate patch and the comparison results thus obtained may be averaged to obtain a final determination of whether or not the candidate patch includes a defect.

Practically, it has been found that results of trial and error experiments to determine similarity tend to cluster such that it is easy to pick a binarization threshold by simply using a value located intermediate the higher and lower clusters. A suitable threshold, for many applications, has been found to be approximately 3.5 SNR.

Typically, pixels are considered similar if their gray levels are only a few values apart, for example, 1-3 units on an 8-bit scale from 0-255 units. Pixels are considered dissimilar if their gray levels are more than a few values apart, for example, 4-255 units on the 8-bit scale. Patches are considered similar if all pixels in the patches—or a defined portion thereof—are mutually similar.

Optionally, the comparing also comprises providing an optimal filter which, when applied to a similar patch, is operative to decrease differences between the similar patch and a defect-less candidate patch to which it is similar; and applying the optimal filter to the at least one first similar patch before comparing at least a portion of the candidate patch to at least a corresponding portion of at least one similar patch to find defects.

Optionally, the comparing includes aligning the candidate patch to the similar patch, performing the applying of the optimal filter, and subtracting respective pixels of the aligned candidate patch from respective pixels of the filtered aligned similar patch to find defects.

The optimal filter typically minimizes the average square difference between candidate and similar patches. It is appreciated that the optimal filter is useful in many other defect detection processes and its applicability is not limited to the particular intra-frame "patch-to-patch" defect detection process shown and described herein. More generally, the present invention includes the following embodiment:

A system or method for finding defects in microscopic objects, the system or method comprising: detecting defects by comparing a candidate defect location to a similar location, including: providing an optimal filter which, when applied to a similar location, is operative to decrease differences between the similar location and a defect-less location to which the similar location is similar; and applying the optimal filter to the at least one similar location before comparing the candidate defect location thereto.

Optionally, the system or method also comprises candidate analysis to identify at least one candidate defect location. Optionally, a computer program product is provided which comprises a computer usable medium having a computer readable program code embodied therein, the computer readable program code adapted to be executed to implement a method for finding defects in microscopic objects, the method comprising: for at least one candidate defect location in an individual frame imaging a portion of at least one manufactured object whose surface bears a microscopic pattern, using a processor for searching for at least one first similar patch within the individual frame which is similar to a first candidate patch containing the candidate defect; and comparing at least a portion of the candidate patch to at least a corresponding portion of at least one similar patch to find defects, if any, at the candidate defect location.

Defect detection on a mask or similar microscopic patterned object often involves comparing identical dies. Since the probability of having the same defect in the same place on two different dies is practically zero, significant dissimilarities between two dies are considered defective. Comparison takes place between two corresponding frames within the dies. Since the detection flow is asymmetrical, it is typically applied twice: Iteration #1: first die—image; second die—reference; and Iteration #2: first die—reference; second die—image. However, the difference between the inspected image and the reference image from the other die is noisy and distinguishing defects from noise is difficult. Therefore, it is an object of certain embodiments of the invention to move from inter-die detection to intra-die detection. Advantages include that noise between different dies is stronger than the noise within a die. Moreover, in intra-frame detection, noise is minimal; therefore, D2D sensitivity may be improved via intra-frame detection. The inputs to the D2D process may include: Image and Reference, and "Candidates", suspected locations provided externally. Outputs may include a Decision per candidate: either Defect or False Alarm (FA). For each candidate, typically, the method opens a patch around a candidate, opens a corresponding patch in the reference, finds a similar patch to the corresponding patch, in the reference, opens the corresponding similar patch in the image and compares the corresponding similar patch in the image to the candidate's patch in the image, and reports a defect if the candidate's patch differs from the similar patches in the image.

Figure 6A:
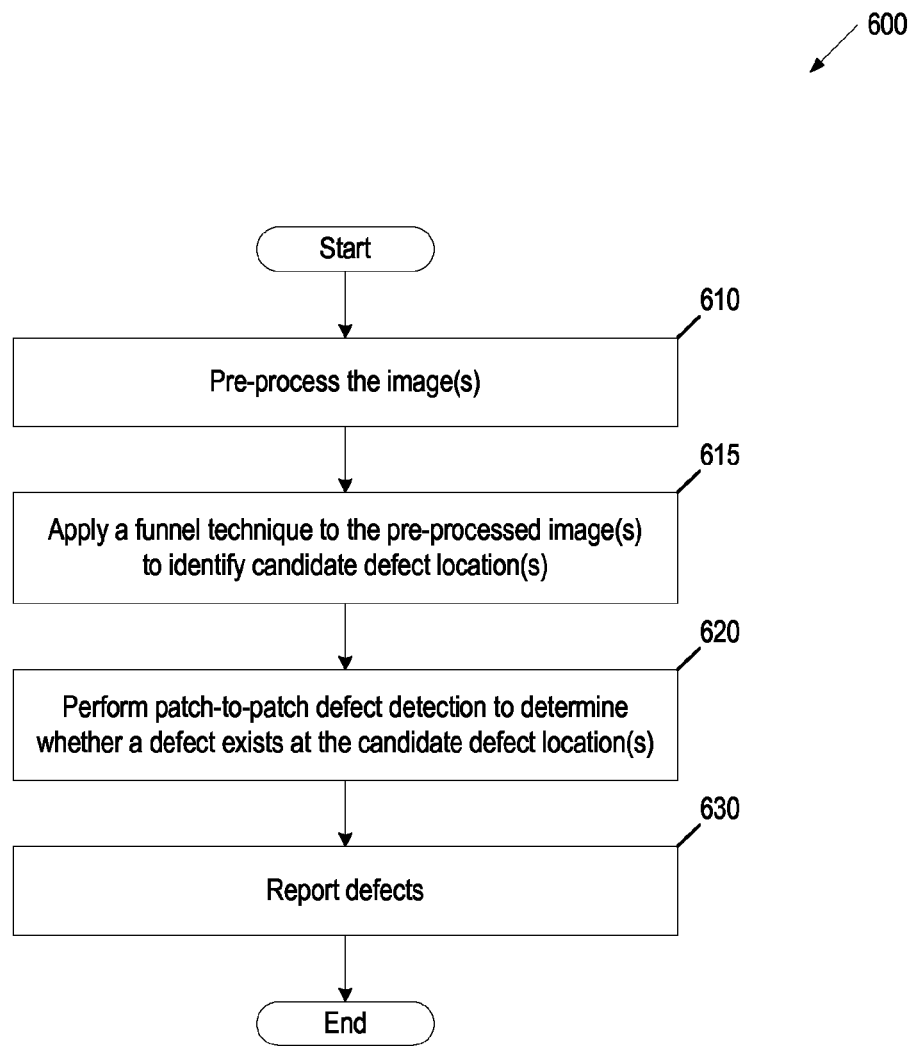
FIG. 6A is a flow diagram of an embodiment of a method of D2D or D2M detection.

FIG. 6A is a flow diagram of an embodiment of a method 600 of D2D or D2M detection. In one embodiment, some portions of method 600 are performed by processing logic of any suitable type defect inspection and/or defect analysis system (e.g., system in defect analysis process 150 in FIG. 1 and/or system in inspection process 140 in FIG. 1) and some portions of method 600 are performed by processing logic of the patch-to-patch defect detection module 107 of FIG. 1. Processing logic can comprise hardware (e.g., circuitry, dedicated logic, programmable logic, microcode, etc.), software (e.g., instructions run on a processing device), or a combination thereof. For example, blocks 620 and 630 of method 600 may be performed by a patch-to-patch defect detection module 107 of FIG. 1.

At block 610, processing logic pre-processes an inspected image using any suitable type of inter-die (for D2D) processing. In one embodiment, processing logic pre-processes an inspected image and a reference image. Examples of pre-processing operations can include, and are not limited to, registration between an inspected image and a reference image and matching the dynamic range between the inspected image and the reference image. Processing logic can match the dynamic range between the inspected image and the reference image, for example, by computing the first two moments (e.g., mean and STD) of the inspected image and the reference image and extract gain and offset to be applied to one image in order to match the moments of the other image. Processing logic can use any suitable image-reference registration method (e.g., intensity-based vs. feature-based, transformation model-based, methods based on spatial vs. frequency domain, single- vs. multi-modality methods, automatic vs. interactive methods). Processing logic can use any suitable similarity measures for image registration, such as, but not limited to, mutual information and normalized mutual information, which are image similarity measures suitable for registration of multimodality images. Such measures may also include cross-correlation, sum of squared intensity differences and ratio image uniformity, which are image similarity measures suitable for registration of images in the same modality.

At block 615, processing logic applies an application-specific funnel technique to the pre-processed image(s) to propose candidate defect location(s). The funnel can be any inter-die comparison computerized process, such as, and not limited to, simple D2D difference and more sophisticated inter-die comparison computerized processes. Processing logic can use any suitable funneling algorithm, such as, and not limited to, an inter-die funnel, operative for pointing out suspected defect locations in the frame, to determine the candidate defect locations. For example, processing logic can subtract the inspected image from the reference image to determine a simple difference and subsequently use a difference threshold to identify large differences as a funnel. Processing logic can generate a funnel score map to be used to identify the candidate defect locations. The funnel score map may include an image that is the size of the frame, with a funnel score at each pixel which is indicative of the degree of suspicion that this pixel might be defective. For example, if the funnel is a simple D2D difference, then the funnel map may comprise a matrix of the D2D absolute difference signals of each pixel in the frame. The number of candidate defect locations to be identified can be an application-specific parameter indicating the number of candidate defect locations to undergo a patch-to-patch defect detection analysis, for example, at block 620. The number of candidates can be a user-defined value (e.g., N=25). One embodiment of determining a list of candidate defect locations using the funnel score map is described in greater detail below in conjunction with FIG. 6B.

Figure 6B:
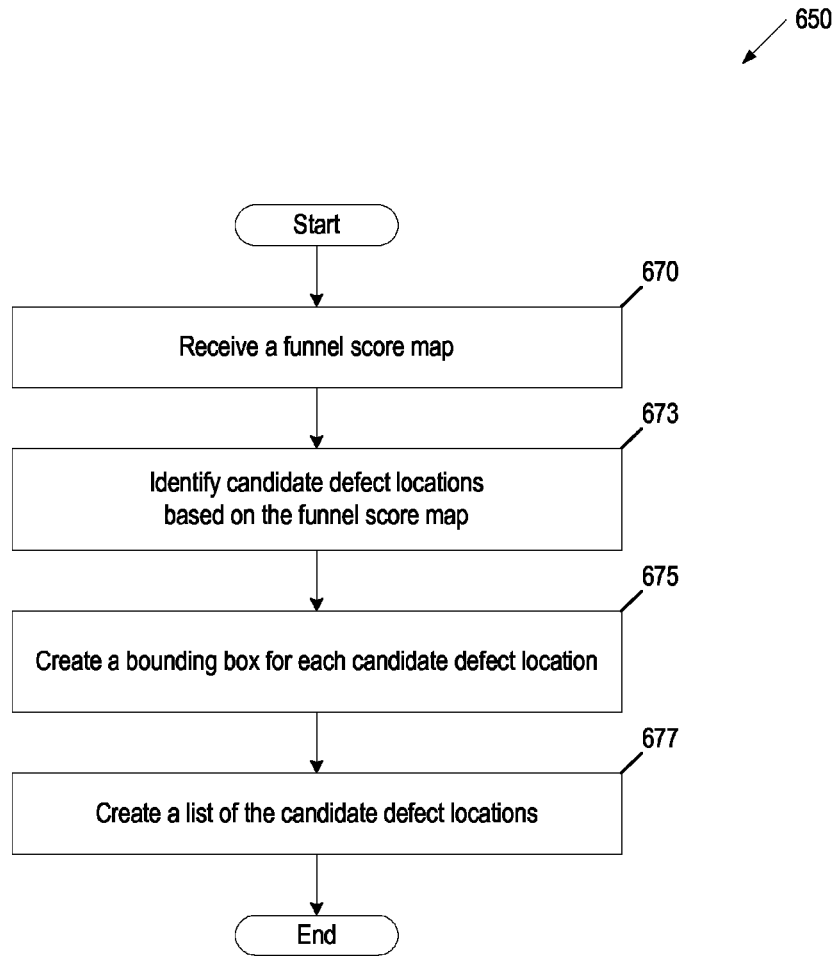
FIG. 6B is a flow diagram of an embodiment of a method for determining a list of candidate defect locations.

FIG. 6B is a flow diagram of an embodiment of a method 650 for determining a list of candidate defect locations. In one embodiment, method 650 is performed by processing logic of any suitable type defect inspection and/or defect analysis system (e.g., system in defect analysis process 150 in FIG. 1 and/or system in inspection process 140 in FIG. 1). Processing logic that can comprise hardware (e.g., circuitry, dedicated logic, programmable logic, microcode, etc.), software (e.g., instructions run on a processing device), or a combination thereof. In another embodiment, method 650 is performed by a patch-to-patch defect detection module 107 of FIG. 1.

At block 670, processing logic receives a funnel score map. The funnel score map can include an image that is the size of the frame with a funnel score at each pixel which is indicative of the degree of suspicion that this pixel might be defective. For example, if the funnel is a simple D2D difference, then the funnel map may include a matrix of the D2D absolute difference signals of each pixel in the frame. At block 673, processing logic identifies a subset of candidate defect locations based on the funnel scores at the pixels in the funnel score map. The number of candidate defect locations to be identified can be a user-defined number (e.g., N=25). One embodiment for identifying the subset of candidate defect locations based on the funnel scope map is described in greater detail below in conjunction with FIG. 7. At block 675, processing logic creates a bounding box for each candidate defect location in the subset. The bounding box can be a dynamic bounding box. According to certain embodiments, as described herein, a "dynamic bounding box" is derived from the bounding box, by modifying at least one characteristic of the bounding box, such as the shape thereof and/or at least a dimension of the size thereof, and/or the relative position thereof in relation to the candidate. The modification is selected to more accurately contain the defect. One embodiment of creating a bounding box for a candidate defect location is described in greater detail below in conjunction with FIG. 17. At block 677, processing logic generates a list of the strongest candidate defect locations based on the funnel score map. Processing logic can be configured to generate a list based on a user-defined number (e.g., a list where N=25 candidate defect locations). The list can include, for each candidate defect location, the location and a bounding box for the corresponding location.

Returning to FIG. 6A, at block 620, processing logic (e.g., processing logic of a patch-to-patch defect detection module 107 of FIG. 1) can use the inspected image, the reference image, and the subset (e.g., list) of defect candidate locations to perform patch-to-patch defect detection to compare the patches in the inspected frame to determine whether a defect exists at the candidate defect location(s). One embodiment of performing patch-to-patch defect detection was described in greater detail above in conjunction with FIG. 3.

At block 630, processing logic reports defects. Processing logic can generate a list of the defective pixels in the current frame (inspected frame), and a decision per each candidate defect location. For example, for each candidate defect location, the list can indicate whether the corresponding candidate defect location is a defect, a false alarm (FA), or cannot be resolved. Typically, if there is a defect in the inspected frame, the defect may correlate to a high funnel score and may be in the top N candidates (e.g., N=25). Typically, patterns in a frame are highly repetitive. A working assumption is that two similar patches in reference are similar in the image except if there is a defect in the image. If a patch contains a defect, no similar patch will typically be found in the image.

Figure 7:
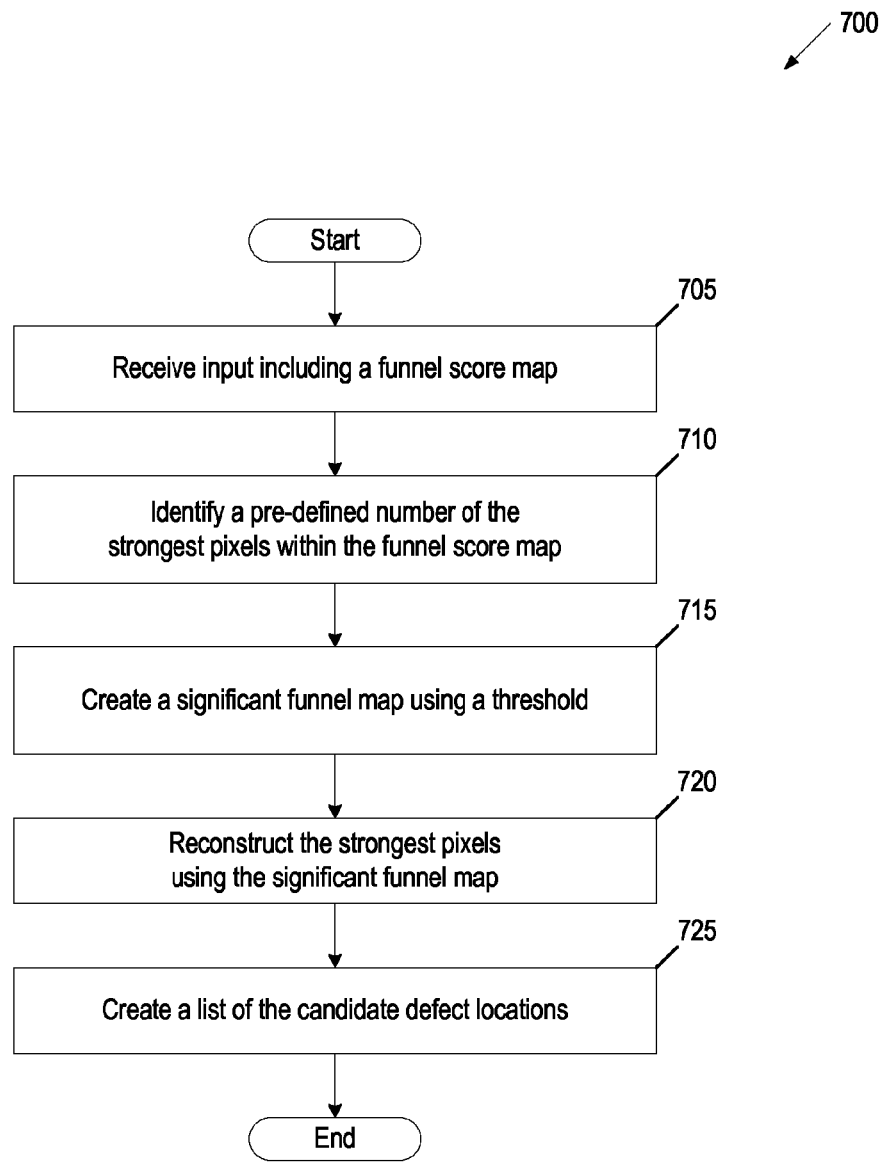
FIG. 7 is a flow diagram of an embodiment of a method for identifying the subset of candidate defect locations based on the funnel scope map.

FIG. 7 is a flow diagram of an embodiment of a method 700 for identifying the subset of candidate defect locations based on the funnel scope map. In one embodiment, method 700 is performed by processing logic of any suitable type defect inspection and/or defect analysis system (e.g., system in defect analysis process 150 in FIG. 1 and/or system in inspection process 140 in FIG. 1). Processing logic that can comprise hardware (e.g., circuitry, dedicated logic, programmable logic, microcode, etc.), software (e.g., instructions run on a processing device), or a combination thereof. In another embodiment, method 700 is performed by a patch-to-patch defect detection module 107 of FIG. 1.

At block 705, processing logic receives input that includes a funnel score map. The funnel score map may include an image that is the size of the frame, with a funnel score at each pixel which is indicative of the degree of suspicion that this pixel might be defective. At block 710, processing logic identifies a pre-defined number of the strongest pixels within the funnel score map based on the funnel scores. The pre-defined number can be a user-defined number (e.g., N=25). In one embodiment, processing logic masks each peak neighborhood. At block 715, processing logic creates a significant funnel map by applying a threshold to the funnel score map. At block 720, processing logic reconstructs the strongest pixels using the significant funnel map. At block 725, processing logic creates a list of the strongest candidates (e.g., N=25) including a defect location and a bounding box for each of the strongest candidate defect locations.

Figure 8:
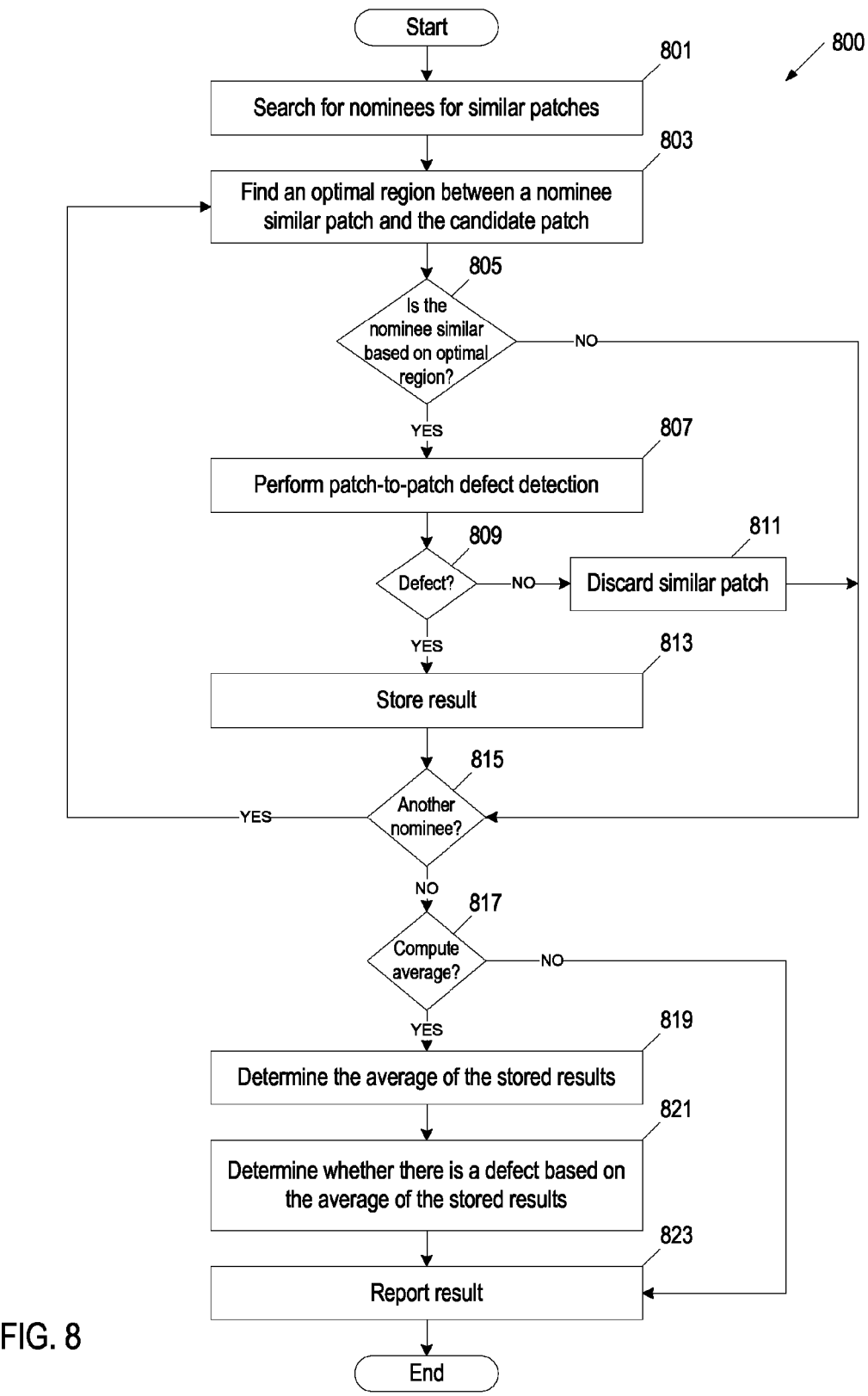
FIG. 8 is a flow diagram of an embodiment of a method for detecting defects by comparing similar patches within an image.

FIG. 8 is a flow diagram of an embodiment of a method 800 for detecting defects by comparing similar patches within an image. Method 800 can be performed by processing logic that can comprise hardware (e.g., circuitry, dedicated logic, programmable logic, microcode, etc.), software (e.g., instructions run on a processing device), or a combination thereof. In one embodiment, method 800 is performed by a patch-to-patch defect detection module 107 of FIG. 1.

At block 801, according to some embodiments, for each candidate defect location, processing logic searches for nominees for similar patches. A nominee similar patch is a patch that is potentially similar to the candidate patch that is associated with the corresponding candidate defect location. In one embodiment, processing logic searches for nominees for similar patches on the inspected image. In another embodiment, processing logic searches for nominees for similar patches on a reference image. One embodiment for searching for similar patches from among nominee similar patches is described in greater detail below in conjunction with FIG. 9.

At block 803, processing logic finds an optimal region between a nominee similar patch and the candidate patch. An optimal region can contain only similar pixels. An optimal region can be any shape, such as, and not limited to, a rectangle, a circular shape, a square, or any arbitrary shape. One embodiment for finding an optimal region is described in greater detail below in conjunction with FIG. 10. At block 805, processing logic determines whether the nominee similar patch is similar to the candidate patch based on the optimal region. Processing logic can determine whether a legal region (e.g., rectangle) was found. A legal region can include a region that satisfies criteria, such as having a minimal area (e.g., 200 pixels) and having a minimum number of pixels in each axis (e.g., 7 pixels). If a legal region was found (block 805), processing logic determines that the nominee similar patch is similar to the candidate patch (in the area of the optimal region) and performs patch-to-patch defect detection at block 807. If a legal region is not found (block 805), processing logic determines that the nominee similar patch is not similar to the candidate patch and determines whether there is another nominee similar patch to process at block 815.

At block 807, processing logic performs patch-to-patch defect detection to determine whether there is a defect at the candidate defect location. One embodiment of performing patch-to-patch defect detection to determine whether there is a defect at the candidate defect location is described in greater detail below in conjunction with FIG. 11. If there is not a defect (block 809), processing logic discards the similar patch at block 811. The discarded similar patch can represent a false alarm in the sense that comparing the candidate patch to the current similar patch yielded a very low difference signal. Processing logic can record data indicating the similar patch is a false alarm. If there is a defect (block 809), processing logic stores the defect result data in a data store that is coupled to the patch-to-patch defect detection module at block 813.

At block 815, processing logic determines whether there is another nominee similar patch. If there is another nominee similar patch, processing logic returns to block 803 to find an optimal region between the next nominee similar patch and the candidate patch. If there is not another nominee similar patch to evaluate (block 815), processing logic determines whether there is sufficient stored results to compute an average at block 817. In one embodiment, processing logic computes an average of the stored results if there are stored results for more than two similar patches. If an average cannot be computed (block 817), processing logic reports the result at block 823. Processing logic can record data and/or report data indicating that the candidate defect location corresponding to the candidate patch is unresolved.

If an average can be computed (block 817), processing logic computes the average of the stored results at block 819 and determines whether there is a defect at the candidate defect location that corresponds to the candidate patch based on the average at block 821. One embodiment of determining whether there is a defect at the candidate defect location that corresponds to the candidate patch based on the average is described in greater detail below in conjunction with FIG. 12.

At block 823, processing logic reports the results of the determination. For example, if there is a defect at the candidate defect location that corresponds to the candidate patch based on the average, processing logic can record data and/or report data indicating there is a defect. If there is not a defect at the candidate defect location that corresponds to the candidate patch based on the average, processing logic can record data and/or report data indicating there is a false alarm.

Figure 9:
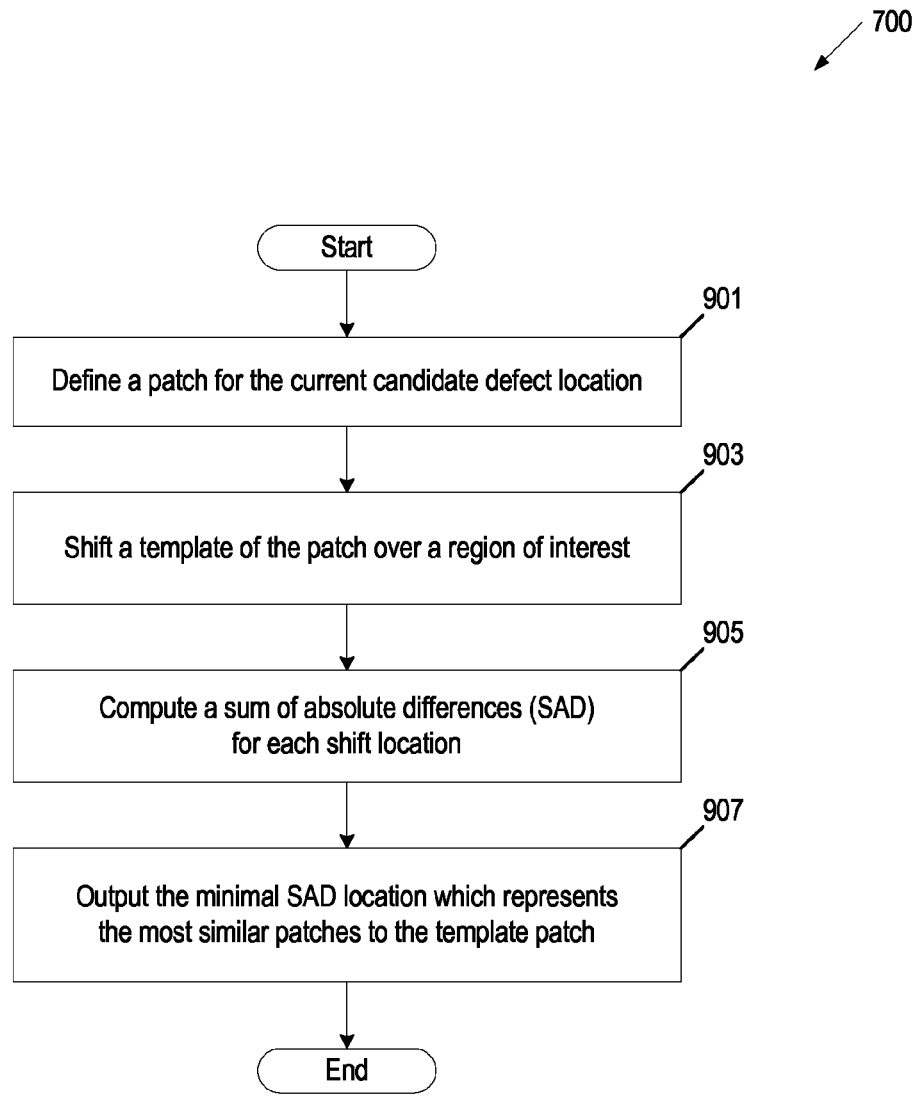
FIG. 9 is a flow diagram of an embodiment of a method for searching for similar patches from among nominee similar patches.

FIG. 9 is a flow diagram of an embodiment of a method 900 for searching for similar patches from among nominee similar patches. Method 900 can be performed by processing logic that can comprise hardware (e.g., circuitry, dedicated logic, programmable logic, microcode, etc.), software (e.g., instructions run on a processing device), or a combination thereof. In one embodiment, method 900 is performed by a patch-to-patch defect detection module 107 of FIG. 1.

At block 901, for a current candidate defect location, processing logic defines a patch for the candidate defect location to create a candidate patch. In one embodiment, processing logic defines a small patch around the candidate defect location. Processing logic finds similar patches nominees (e.g., M=30) within the patch environment using a similarity metric, such as Mean Absolute Difference (MAD). MAD (Mean Absolute Difference) computations are also termed herein as SAD (Sum Absolute Difference) computations. The number of similar patches to find can be a user-defined value (e.g., M=30). At block 903, processing logic shifts a template of the candidate patch over a current ROI (region of interest). At block 905, for each shift location, processing logic computes a sum of absolute differences (SAD). In one embodiment, processing logic computes the SAD as:

$$\text{SAD}(m,n) = \Sigma_{i,j} |\text{Template}_{i,j} - img_{i,j}^{m,n}| \qquad \text{Eq. 1}$$

At block 907, processing logic outputs the minimal SAD locations that represent the most similar patches to template patch. The minimal SAD computations can refer to a computation of a SAD (Sum Absolute Difference) of the candidate patch ("template") with each pixel in a ROI=Region of Interest, taking locations (for example 30) with minimal SAD values. The ROI can be a certain part of the frame, even the entire frame.

Figure 10:
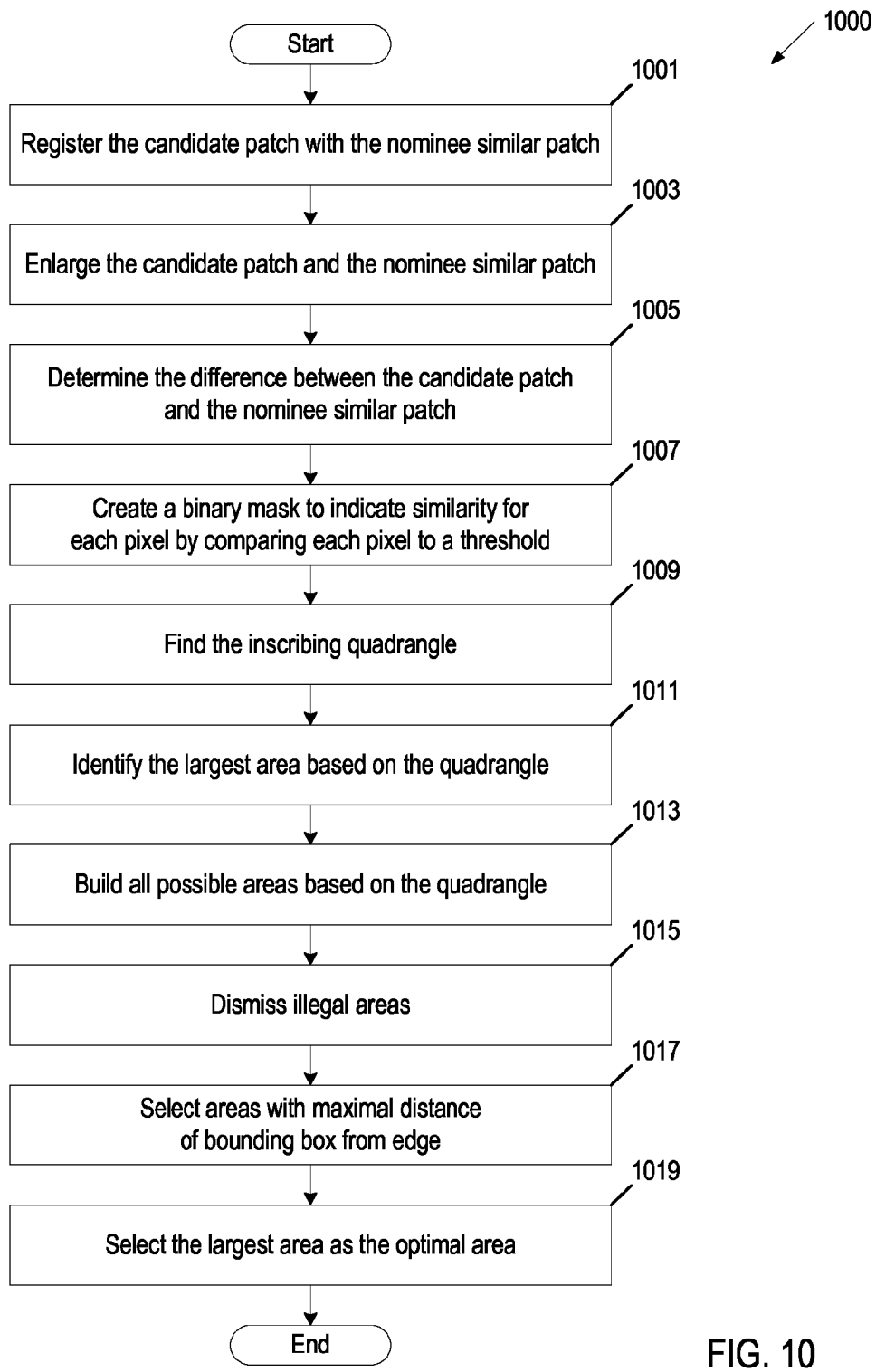
FIG. 10 is a flow diagram of an embodiment of a method for finding an optimal region between a nominee similar patch and the candidate patch.

FIG. 10 is a flow diagram of an embodiment of a method 1000 for finding an optimal region between a nominee similar patch and the candidate patch. Method 1000 can be performed by processing logic that can comprise hardware (e.g., circuitry, dedicated logic, programmable logic, microcode, etc.), software (e.g., instructions run on a processing device), or a combination thereof. In one embodiment, method 1000 is performed by a patch-to-patch defect detection module 107 of FIG. 1.

At block 1001, processing logic, registers the candidate patch with a nominee similar patch. One embodiment for registering a candidate patch with a nominee similar patch is described in greater detail below in conjunction with FIG. 14. At block 1003, processing logic enlarges the candidate patch and the nominee similar patch to a larger patch. Examples of an enlarged size can include, and are not limited to, 50 pixels by 50 pixels, 30 pixels by 30 pixels, and 70 pixels by 70 pixels. At block 1005, processing logic computes the difference between the candidate patch and the nominee similar patch. At block 1007, processing logic creates a binary masking indicating a similarity for each pixel by comparing each pixel to a threshold, At block 1009, processing logic finds the quadrangle that inscribes only pixels that were tagged as similar. At block 1011, processing logic identifies the largest area (e.g., rectangle) that necessarily touches two opposite sides of the quadrangle found. Examples of an area can include, and are not limited to, a rectangle, a square, a circular shape, and an arbitrary shape. Processing logic may save time in finding the largest area (e.g., rectangle) by checking only the areas (e.g., rectangles) that satisfy the property of touching two opposites sides of the quadrangle instead of checking all possible areas (e.g., rectangles). At block 1013, processing logic builds all possible areas (e.g., rectangles) which have two opposite corners touching two opposite sides of the quadrangle. At block 1015, processing logic dismisses illegal areas (e.g., illegal rectangles). Illegal areas can include areas that do not satisfy criteria, such as having a minimal area (e.g., 200 pixels) and having a minimum number of pixels in each axis (e.g., 7 pixels). At block 1017, for each area (e.g., rectangle), processing logic finds the minimal distance between the candidates bounding box and each edge (e.g., side) of the area (e.g., rectangle) and selects areas (e.g., rectangles) for which distance of hole from edge is maximal.

At block 1019, processing logic identifies the largest of the selected areas (e.g., rectangles) as the optimal area (e.g., rectangle). The optimal area (e.g., rectangle) contains only similar pixels. According to certain embodiments, for each (e.g., patch, nominee similar patch) pair, processing logic searches for an area (e.g., rectangle) containing only similar pixels between the patch and the similar patch. This area (e.g., rectangle) indicates the region in which the two patches are actually similar. Of the possible areas (e.g., rectangles), typically an "optimal rectangle", containing only similar pixels, is selected. "Optimal" can be taken to mean that the distance of the candidate bounding box from the edge of the patch is maximal up to a certain distance, that was empirically found to give high evidence of similarity in the image (e.g., 2-3 pixels), beyond which there is no preference. This allows detection to be performed on as many pixels in the bounding box as possible. "Optimal" can be the area of the optimal rectangle is maximal to facilitate robust noise estimation. "Optimal" can be the rectangle is legal i.e. meets minimal criteria such as having a minimal area (e.g., 200 pixels) and having a minimum number of pixels in each axis (e.g., 7 pixels).

Figure 11:
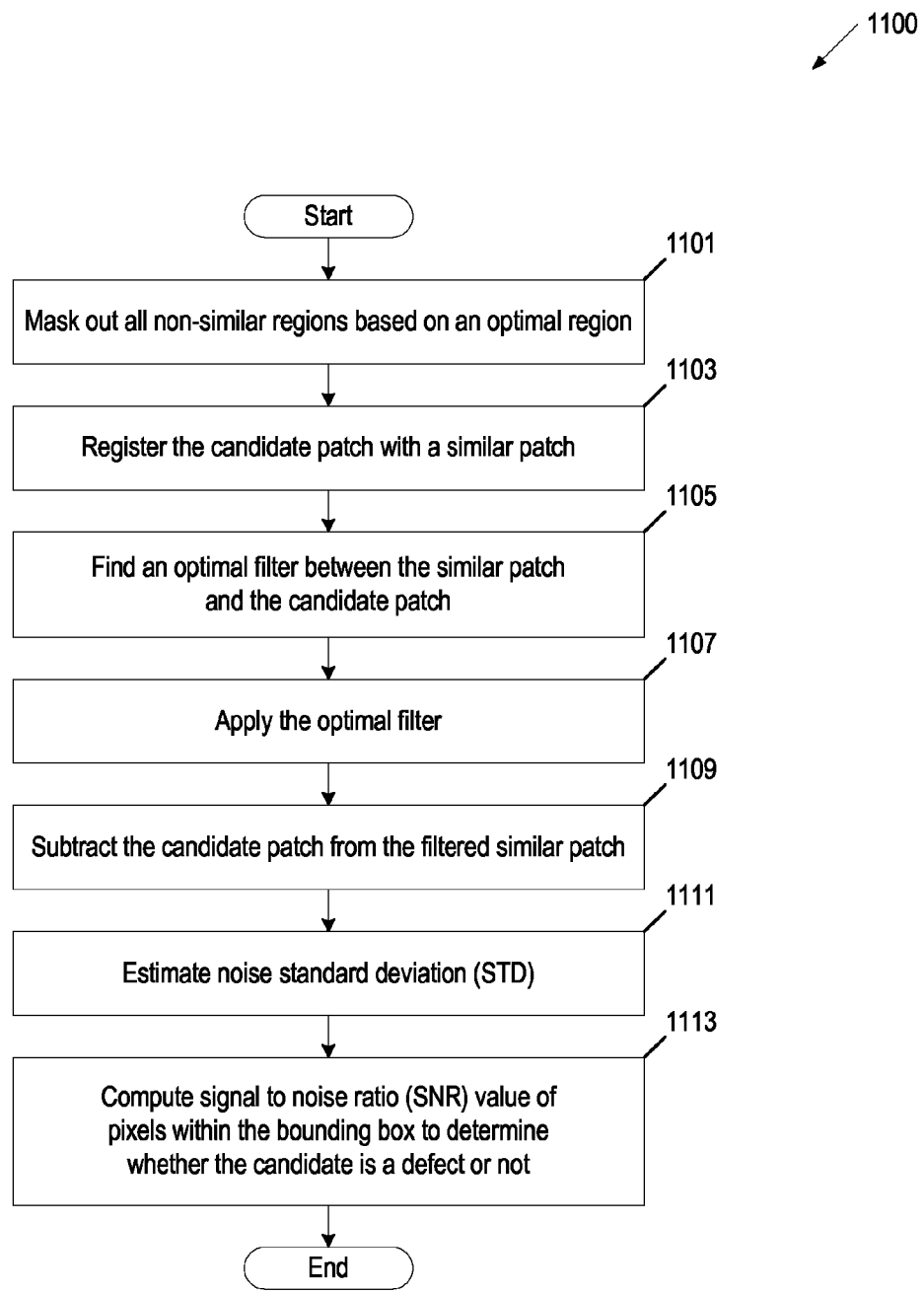
FIG. 11 is a flow diagram of an embodiment of a method for performing patch-to-patch defect detection to determine whether there is a defect at the candidate defect location.

FIG. 11 is a flow diagram of an embodiment of a method 1100 for performing patch-to-patch defect detection to determine whether there is a defect at the candidate defect location. Method 1100 can be performed by processing logic that can comprise hardware (e.g., circuitry, dedicated logic, programmable logic, microcode, etc.), software (e.g., instructions run on a processing device), or a combination thereof. In one embodiment, method 1100 is performed by a patch-to-patch defect detection module 107 of FIG. 1.

At block 1101, processing logic masks out all non-similar regions, according to a found optimal area (e.g., an optimal rectangle). At block 1103, processing logic registers the candidate patch with the similar patch. One embodiment for registering a candidate patch with a nominee similar patch is described in greater detail below in conjunction with FIG. 14. In one embodiment, in D2D/D2M applications, if desired, processing logic can employ registration results from the reference instead of registering (aligning) a patch and similar patch, or the reference results may be used as an initialization to a suitable registration process applied to the image patches, so the registration on the image patches converges in less time, hence saving throughput. At block 1105, processing logic finds an optimal filter between the similar patch and candidate patch. For example, processing logic can use a "Least "Squares" solution to find an optimal filter. Given two patches, R, I, and filter h, of size N×N pixels, that satisfies:

$$h = \operatorname{argmin} \|R * h - I\|_2 \qquad \text{Eq. 2}$$

Let $R_0, R_2, \ldots R_{N^2-1}$ be the pixels of a certain cell in R at the size of the filter h.

Let $$I_{\frac{N^2}{2}}$$

be the pixel corresponding to the center of the cell in I.

Processing logic can look for a set of coefficients that minimizes:

$$\left\| \sum_{k=0}^{N^2-1} hR - I_{\frac{N^2}{2}} \right\|^2 \qquad \text{Eq. 3}$$

The same can be applied for each cell N×N in the patch over determines set of equations:

$$\hat{h} =_h{}^{\operatorname{argmin}} \|Ah - b\|^2 \qquad \text{Eq. 4}$$

Where each row A is a cell N×N taken from. b is the patch I formed into a vector and h is the filter coefficients formed into a vector.

The Least Squares solution is given by:

$$\hat{h} = (A^T A)^{-1} A^T b \qquad \text{Eq. 5}$$

The optimal filter may comprise a linear filter between reference and defect patches designed to overcome differences between patches that may include, but not be limited to, some or all of: Focus differences, FOV (field of view) distortion, and Registration residues. If desired, processing logic can set the optimal filter size dynamically according to the geometry of the found shape (e.g., rectangle).

Returning to FIG. 11, at block 1107, processing logic applies the optimal filter on the similar patch. At block 1109, processing logic subtracts the candidate patch from the filtered similar patch including masking out the filter margins. At block 1111, processing logic estimates noise standard deviation (STD). In one embodiment, processing logic estimates noise STD directly by computing STD of out-of-bounding-box pixels. In another embodiment, the noise STD may be provided by a pre-learned LUT (look-up-table) for noise estimation that is generated by offline learning of the noise behavior in a set-up stage.

At block 1113, processing logic computes a signal to noise ratio (SNR) value of pixels within the bounding box. For example, processing logic may use SNR=Diff (GL)/noise STD to determine whether the candidate defect location has a defect, where GL is gray level. instead of looking at the candidate SNR, processing logic uses other attributes, such as, but not limited to, any or all of regular GL (gray level) difference, energy, size, shape, in order to determine whether the candidate defect location is a defect or not.

Figure 12:
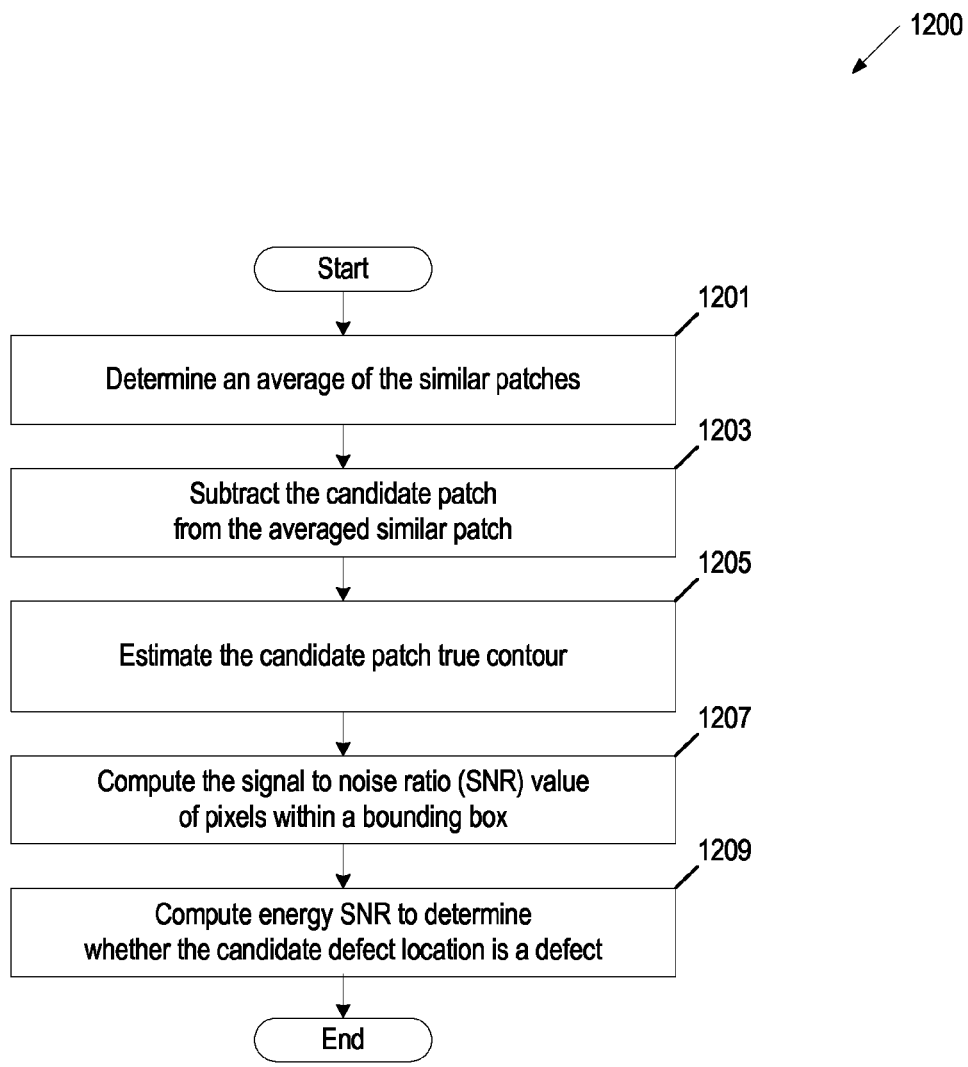
FIG. 12 is a flow diagram of an embodiment of a method for determining whether there is a defect at the candidate defect location that corresponds to the candidate patch based on the average.

FIG. 12 is a flow diagram of an embodiment of a method 1200 for determining whether there is a defect at the candidate defect location that corresponds to the candidate patch based on the average. Method 1200 can be performed by processing logic that can comprise hardware (e.g., circuitry, dedicated logic, programmable logic, microcode, etc.), software (e.g., instructions run on a processing device), or a combination thereof. In one embodiment, method 1200 is performed by a patch-to-patch defect detection module 107 of FIG. 1.

Method 1200 can be performed after processing logic has processed all nominee similar patches and has selected those nominee similar patches that pass that are deemed similar patches. Each similar patch may have also been registered to the candidate patch and optionally filtered by its suitable optimal filter. The nominee similar patches can be combined to determine an average using, for example, a simple average and/or weighted average.

At block 1201, processing logic determines an average of the similar patches. In one embodiment, processing logic determines an average of all similar patches, where averaging of each pixel may be affected with relevant patches. In another embodiment, processing logic does not average all similar patches that were found. Processing logic can select similar patches to use for averaging based on criteria, for example, similar patches that yield low enough noise and/or similar patches that are large enough.

Let $P$ be the Pattern and $N_i (i \in \{1, 2, \ldots, K\})$ be independent $WGN \sim (0, \sigma 2)$.
Patch = $P + N_0$
Similar Patch($i$) = $P + N_i$, $i = 1, 2, 3, \ldots, K$ $$\text{Averaged } K \text{ Similar Patches} = \frac{\sum_{i=1}^{K}(P+N_i)}{K} = I + \frac{\sum_{i=1}^{K}(N_i)}{K} \quad \text{Eq. 6A}$$

$$\frac{\sum_{i=1}^{K}(N_i)}{K} \sim N\left(0, \frac{\sigma^2}{K}\right) \quad \text{Eq. 6B}$$

At block 1203, processing logic subtracts the candidate patch from the averaged similar patch.

$$\text{Difference} = \text{Patch} - \text{Averaged } K \text{ Similar Patches} = \quad \text{Eq. 7}$$

$$P + N_0 - \left(P + \frac{\sum_{i=1}^{K}(N_i)}{K}\right) =$$

$$N_0 - \frac{\sum_{i=1}^{K}(N_i)}{K} \sim N\left(0, \sigma^2 + \frac{\sigma^2}{K}\right) = N\left(0, \sigma^2\left(1 + \frac{1}{K}\right)\right)$$

The noise reduction may depend on the number of patches in the averaging and therefore, each pixel in the difference may be multiplied by a factor for uniform noise level. In one embodiment, processing logic may determine the computation factor as follows:

$$\text{Computation Factor} = \frac{1}{\sqrt{1 + \frac{1}{K}}} \quad \text{Eq. 8}$$

The computation factor may be made for each individual pixel, where K is the number of similar patches found that contained the individual pixel.

In one embodiment, processing logic estimates noise STD by any suitable alternative method, such as offline learning of noise behavior, at block 1203. At block 1205, processing logic estimates the candidate patch true contour. At block 1207, processing logic computes the SNR value of pixels within a bounding box. One embodiment of finding a bounding box is described in greater detail below in conjunction with FIG. 13. Processing logic may estimate noise STD, for example, by directly computing the STD of out-of-bounding-box pixels. Alternatively or in addition, a noise STD value may be provided by a pre-learned LUT (look-up-table) for noise estimation.

At block 1209, processing logic may in parallel compute the energy SNR for energy detection to look at the candidate defect location energy to determine whether the candidate defect location is a defect. Processing logic may compute energy SNR as:

$$\sqrt{\frac{\text{normalized}_{\text{diff}}^2}{\sum_{\text{defectpixels}}}} \quad \text{Eq. 9}$$

In one embodiment, at block 1209, instead of looking at the candidate SNR or energy to determine whether a candidate is a defect, processing logic can use other criteria such as, but not limited to, some or all of the following attributes: conventional Gray Level (GL), difference, size, shape.

Figure 13:
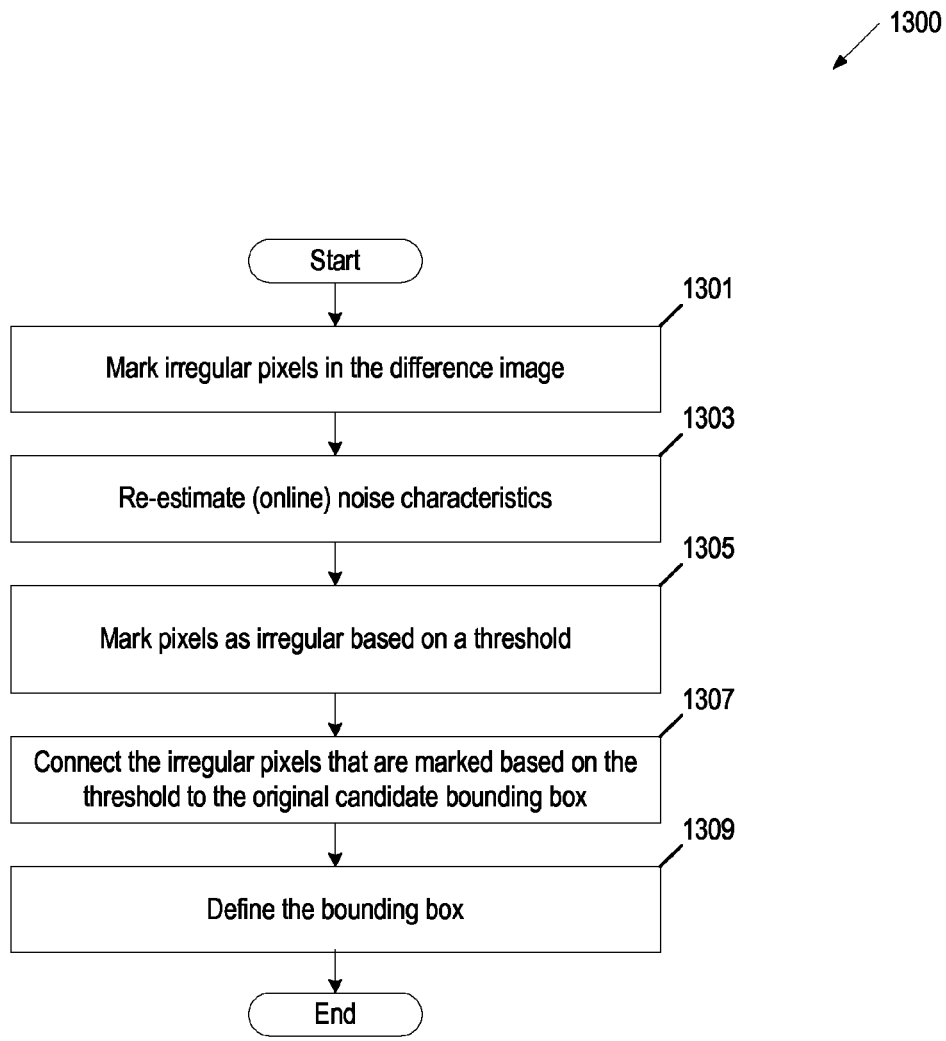
FIG. 13 is a flow diagram of an embodiment of a method for finding a bounding box.

FIG. 13 is a flow diagram of an embodiment of a method 1300 for finding a bounding box. Method 1300 can be performed by processing logic that can comprise hardware (e.g., circuitry, dedicated logic, programmable logic, microcode, etc.), software (e.g., instructions run on a processing device), or a combination thereof. In one embodiment, method 1300 is performed by a patch-to-patch defect detection module 107 of FIG. 1. Method 1300 can be useful in performing the contour estimation at block 1205 of FIG. 12 and SNR within bounding box computation at block 1207 of FIG. 12 in accordance with certain embodiments of the present invention.

At block 1301, processing logic marks the irregular pixels in the different image using offline noise estimation. At block 1303, processing logic masks all irregular pixels found and re-estimates (online) noise characteristics using only remaining, i.e. "normal" (non-irregular) pixels, for example, by computing STD (standard deviation) of the "normal" pixels. At block 1305, processing logic marks pixels as irregular based on a threshold. Processing logic marks pixels which are irregular in comparison to the learned noise characteristics (e.g., pixels whose difference signal in absolute value is higher than K×STD from stage 1320) as irregular. K may be any suitable parameter such as 3, or anywhere in the range of 2-5. At block 1307, processing logic connects all irregular pixels marked based on the threshold to the original candidate bounding box and considers these irregular pixels as belonging to the defect. At block 1309, processing logic defines the bounding box by estimating anew the bounding box of all pixels found to belong to defect. Processing logic can define (not necessarily rectangular) a contour that encloses these pixels as the contour of the defect.

Two non-limiting examples are now described:

Example 1

Dynamic Bounding Box Motivation

Candidate's bounding box accuracy depends on the funnel performance. Certain funnels may yield relative inaccurate bounding boxes for defects, especially large defects. A possible way to compute the defect's score (SNR) is as follows: P2P score=Difference within bounding box/std of difference pixels outside bounding box. The defect may not be entirely contained in the bounding box computed by Candidate Analysis step 210 described herein. Therefore, there may be defective pixels outside the bounding box. If estimating noise STD according to defective pixels in which the difference signal is significantly higher than regular noise pixels, an over-estimation of the noise STD (denominator in the P2P score computation) May result. Therefore, the P2P score of large defects tends to be lower than the 'true' score.

Example 2

Another Example Motivation

A possible attribute to be computed for each defect is its energy, typically defined as the squared sum of the SNR signal over all of the defect's pixels. Energy scoring may be performed in the energy detection (e.g., as described at block 1209 in FIG. 12). If the defect's contour is inaccurate, true defective pixels may be left out of this computation, or non-defective pixels may be erroneously included in this computation, yielding a less-than-optimal accuracy of the estimated energy signal. Therefore, the true contour of the defect is typically sought before computing the SNR signal. This may be done by finding irregular pixels connected to the original bounding box, thereby correctly determining the P2P score thus enabling reliable detection of large defects.

It is appreciated that, in certain embodiments, shallow defects tend to be relatively weak, but spread over a large are. A detection mechanism based on strongest difference pixel may cause difficulties in detecting shallow defects. Computing the defect's total energy may be preferable for these defects.

Figure 14:
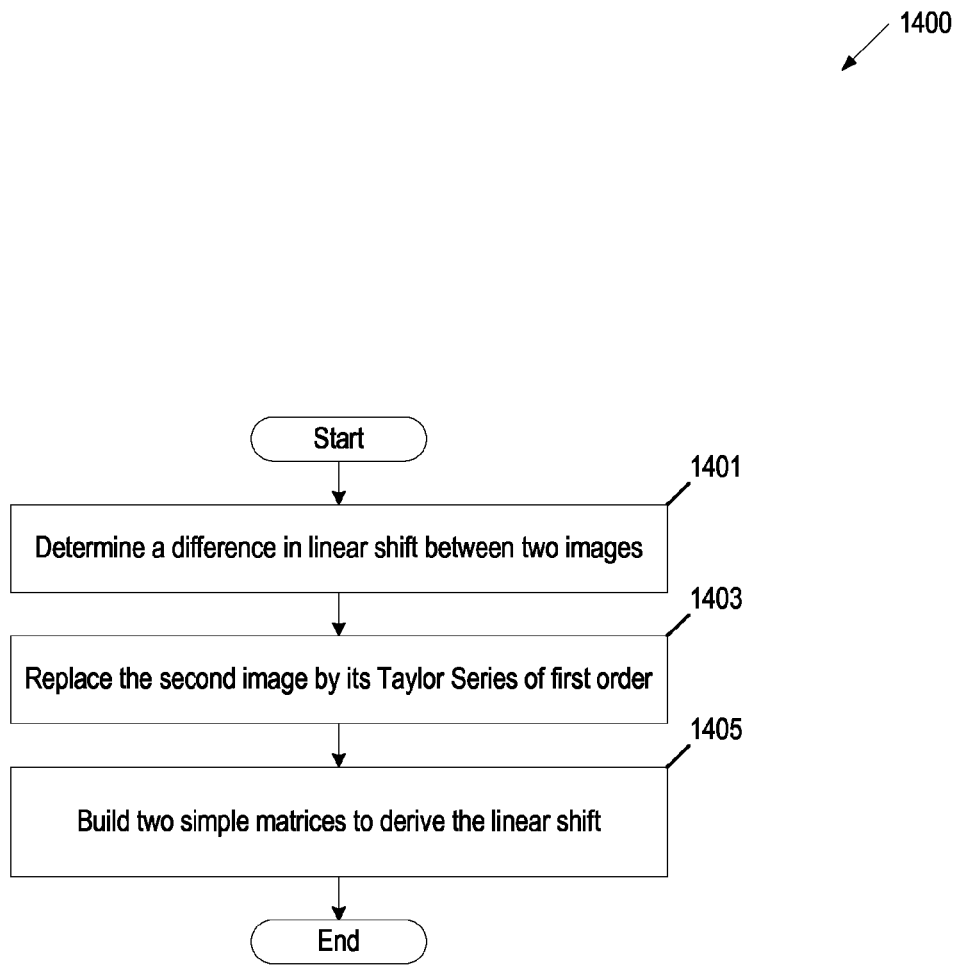
FIG. 14 is a flow diagram of an embodiment of a method for registering a candidate patch with a nominee similar patch.

FIG. 14 is a flow diagram of an embodiment of a method 1400 for registering a candidate patch with a nominee similar patch. Method 1400 can be performed by processing logic that can comprise hardware (e.g., circuitry, dedicated logic, programmable logic, microcode, etc.), software (e.g., instructions run on a processing device), or a combination thereof. In one embodiment, method 1400 is performed by a patch-to-patch defect detection module 107 of FIG. 1. In one embodiment, registering a candidate patch with a nominee similar patch uses a Lucas Kanade registration method.

At block 1401, processing logic determines a difference in linear shift between two images. Let T1 and T2 represent two images and the difference in linear shift is represented by $\Delta x, \Delta y$. Processing logic can determine $\Delta x, \Delta y$, such that:

$$\Delta x, \Delta y^{arg\ min} SSD(\Delta x, \Delta y) = \Delta x, \Delta y^{arg\ min} \Sigma_{x,y}(T_1(x,y) - T_2(x+\Delta x, y+\Delta y))^2 \quad \text{Eq. 10}$$

At block 1403, processing logic replace the second image by it Taylor Series of a first order:

$$\Delta x, \Delta y^{arg\ min} SSD(\Delta x, \Delta y) = \Delta x, \Delta y^{arg\ min} \Sigma_{x,y}(T_1(x,y) - T_2(x, y) + T_{2x}\Delta x + T_{2y}\Delta y)^2 \quad \text{Eq. 11}$$

Processing logic can derive SSD ($\Delta x, \Delta y$) by $\Delta x$ and by $\Delta y$, and compare each to 0

$$\begin{pmatrix} \sum T_{2x}^2 & \sum T_{2y}T_{2x} \\ \sum T_{2x}T_{2y} & \sum T_{2y}^2 \end{pmatrix} \begin{pmatrix} \Delta x \\ \Delta y \end{pmatrix} = \begin{pmatrix} \sum (T_2 - T_1)T_{2x} \\ \sum (T_2 - T_1)T_{2y} \end{pmatrix} \quad \text{Eq. 12}$$

At block 1405, process logic builds two simple matrices to derive the linear shift. Processing logic can build two simple matrices and perform a simple inversion. This process can be done iteratively when (T2−T1) is the only element that is re-computed in each iteration.

Figure 15:
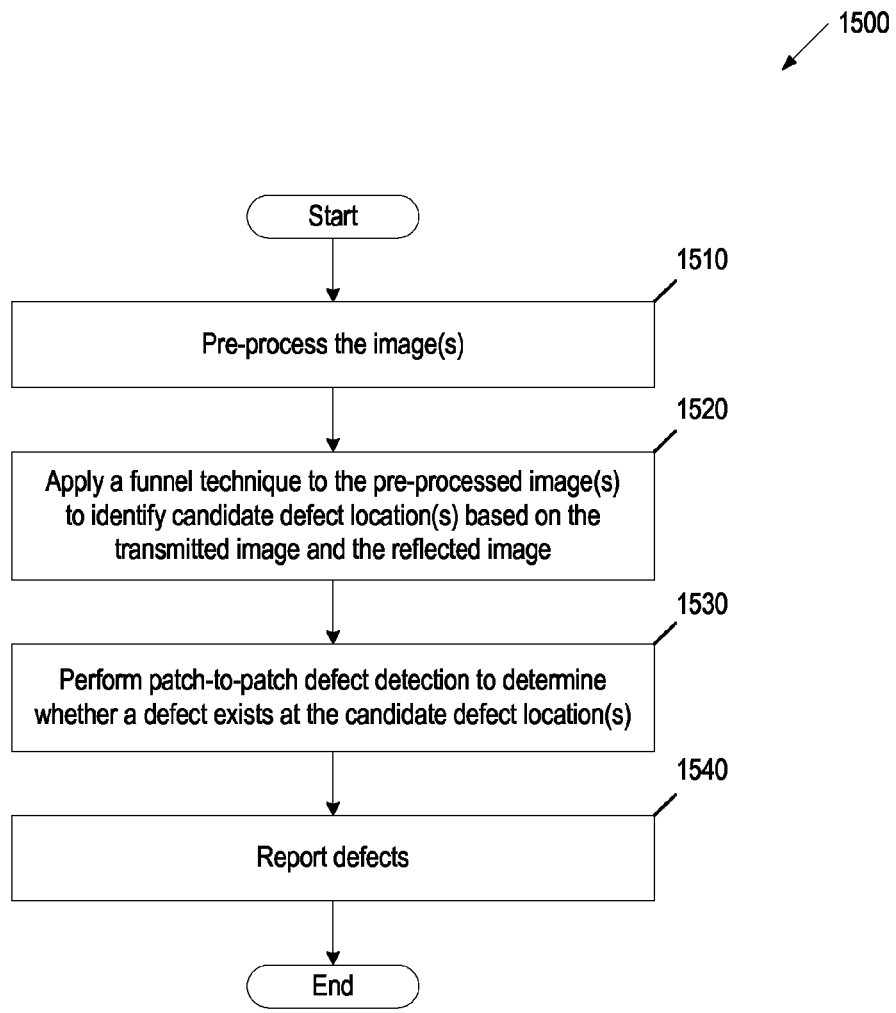
FIG. 15 is a flow diagram of an embodiment of a method of light-based imaging defect detection.

FIG. 15 is a flow diagram of an embodiment of a method 1500 of light-based imaging defect detection. In one embodiment, some portions of method 1500 are performed by processing logic of any suitable type defect inspection and/or defect analysis system (e.g., system in defect analysis process 150 in FIG. 1 and/or system in inspection process 140 in FIG. 1) and some portions of method 1500 are performed by processing logic of the patch-to-patch defect detection module 107 of FIG. 1. Processing logic can comprise hardware (e.g., circuitry, dedicated logic, programmable logic, microcode, etc.), software (e.g., instructions run on a processing device), or a combination thereof. For example, blocks 1505 and 1507 of method 1500 may be performed by a patch-to-patch defect detection module 107 of FIG. 1.

As described above, light-based imaging defect detection is a variant of defect detection for microscopic objects, in which comparisons are made between an image of the transmitted light (Tx) and another image of the reflected light (Rf). The method 1500 for light-based imaging defect detection may have some similar features as the DTD/DTM (et al) defect detection method as described in method 600 of FIG. 6A.

At block 1510, processing logic receives as input some or all of: a digital Transmitted Image (Tx) generated by sensor (e.g., CCD) collecting the light transmitted through the microscopic object, a digital Reflected Image (Rf) generated by sensor (e.g., CCD) collecting the light reflected from the microscopic object, a Funnel Score Map and a Number of candidates. The funnel score map can be created by any computerized process receiving the Tx and Rf images and generating therefrom a score (e.g., assuming Tx+Rf=255 GL, processing logic can look at the absolute difference of Tx+Rf from 255) for each pixel, indicating how strongly that pixel is suspected of being a defect. The "number of candidates" can be a user-defined parameter set by the user and usually tuned according to throughput consideration; the lower the number of candidates, the faster the computerized process.

At block 1510, processing logic pre-processes an inspected image. Examples of pre-processing operations can include, and are not limited to, registration of the inspected. Processing logic can use any suitable similarity measures for image registration, such as, but not limited to, mutual information and normalized mutual information, which are image similarity measures suitable for registration of multimodality images. Such measures may also include cross-correlation, sum of squared intensity differences and ratio image uniformity, which are image similarity measures suitable for registration of images in the same modality.

At block 1520, processing logic applies an application-specific funnel technique to the pre-processed image(s) to propose candidate defect location(s) based on the transmitted (Tx) and reflected (Rf) images. Processing logic can use any suitable funneling algorithm, such as, and not limited to, an inter-die funnel, operative for pointing out suspected defect locations in the frame, to determine the candidate defect locations. For example, processing logic can subtract the inspected image from the transmitted image and/or the reflected image to determine a simple difference and subsequently use a difference threshold to identify large differences as a funnel. Processing logic can generate a funnel score map to be used to identify the candidate defect locations. The funnel score map may include an image that is the size of the frame, with a funnel score at each pixel which is indicative of the degree of suspicion that this pixel might be defective.

At block 1530, processing logic (e.g., processing logic of a patch-to-patch defect detection module 107 of FIG. 1) can use the inspected image, the transmitted image, the reflected image, and the subset (e.g., list) of defect candidate locations to perform patch-to-patch defect detection to compare the patches in the inspected frame to determine whether a defect exists at the candidate defect location(s). One embodiment of performing patch-to-patch defect detection was described in greater detail above in conjunction with FIG. 3.

At block 1540, processing logic reports defects. Processing logic can generate a list of the defective pixels in the current frame (inspected frame), and a decision per each candidate defect location. For example, for each candidate defect location, the list can indicate whether the corresponding candidate defect location is a defect, a false alarm (FA), or cannot be resolved. Typically, if there is a defect in the inspected frame, the defect may correlate to a high funnel score and may be in the top N candidates (e.g., N=25). Typically, patterns in a frame are highly repetitive. Given two patches with a hole in the center of each, the similarity outside (e.g., in the vicinity of) the hole indicates similarity inside the hole, assuming that the area outside the hole is large enough. Therefore, differences inside the hole are indicative of a defect. If the similar area that is found outside the hole is not large enough, the two patches are not deemed similar. This ensures that only patches, in which the similar area outside the hole is large enough, are actually used for detection.

In one embodiment, instead of searching for similar patches on the transmitted image and then separately on the reflected image, one modality (e.g., the reflected image) can employ similarity results from the other modality (e.g., the transmitted image) because similar patches in the transmitted image are often also similar in the reflected image such that there is no need to search both the reflected image and the transmitted image.

Figure 16:
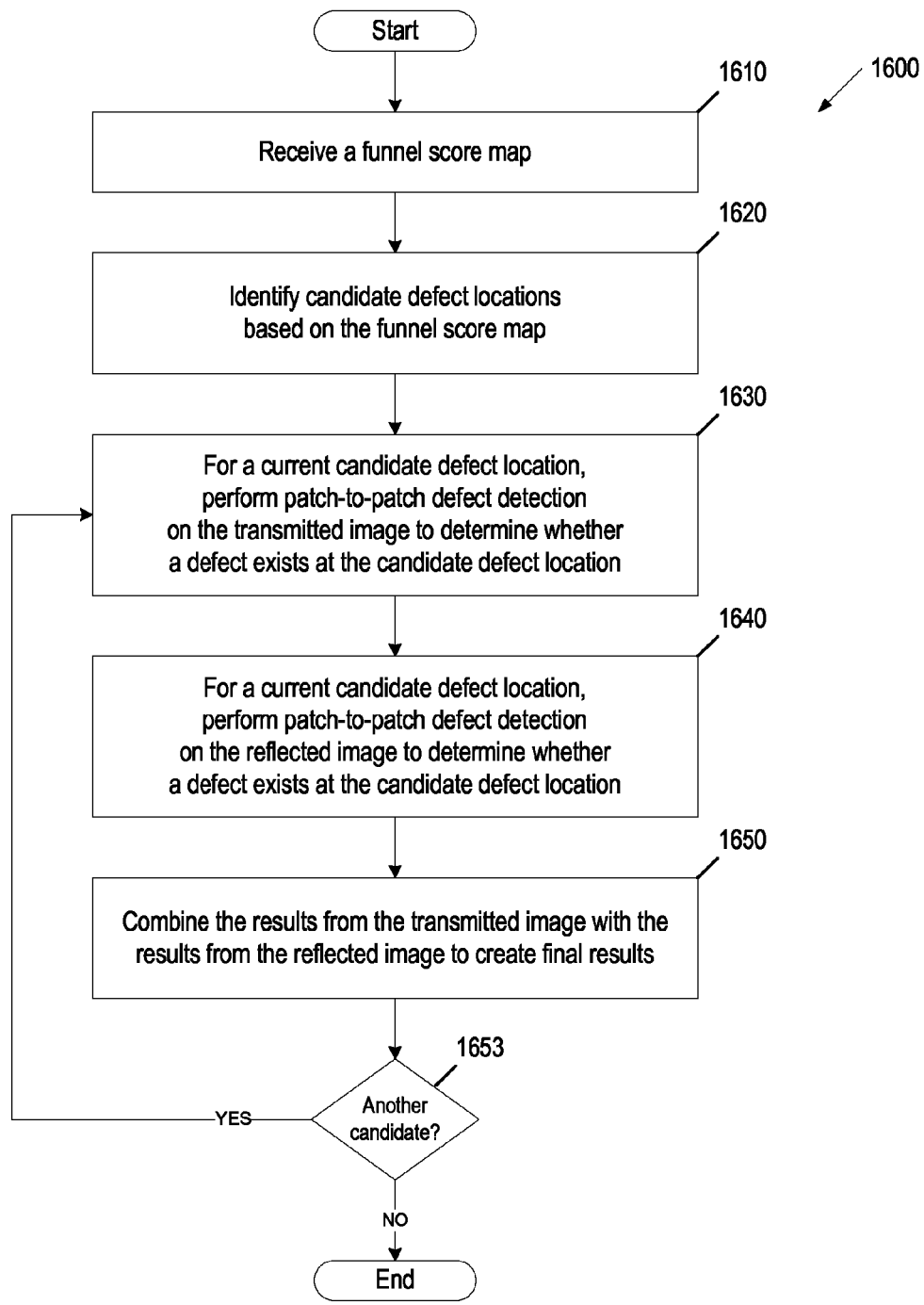
FIG. 16 is a flow diagram of an embodiment of a method for intra-frame defect detection.

FIG. 16 is a flow diagram of an embodiment of a method 1600 for intra-frame defect detection. Method 1600 can be performed by processing logic that can comprise hardware (e.g., circuitry, dedicated logic, programmable logic, microcode, etc.), software (e.g., instructions run on a processing device), or a combination thereof. In one embodiment, method 1600 is performed by a patch-to-patch defect detection module 107 of FIG. 1.

At block 1610, processing logic receives a funnel score map. The funnel score map can include an image that is the size of the frame with a funnel score at each pixel which is indicative of the degree of suspicion that this pixel might be defective. At block 1620, processing logic identifies a subset of candidate defect locations based on the funnel scores at the pixels in the funnel score map. The number of candidate defect locations to be identified can be a user-defined number (e.g., N=25). One embodiment for identifying the subset of candidate defect locations based on the funnel scope map is described in greater detail above in conjunction with FIG. 7. At block 1630, for a current candidate defect location, processing logic performs patch-to-patch defect detection on a transmitted image. One embodiment for performing patch-to-patch defect detection on a transmitted image is described in greater detail below in conjunction with FIG. 17. At block 1640, for a current candidate defect location, processing logic performs patch-to-patch defect detection on a reflected image. One embodiment for performing patch-to-patch defect detection on a reflected image is described in greater detail below in conjunction with FIG. 18. At block 1650, processing logic combines the results for the transmitted image with the results for the reflected image to create final results for the current candidate defect location. One embodiment for combining the results for the transmitted image with the results for the reflected image is described in greater detail below in conjunction with FIG. 19. At block 1653, processing logic determines whether there is another candidate to process. If there is another candidate, processing logic returns to block 1630.

Figure 17:
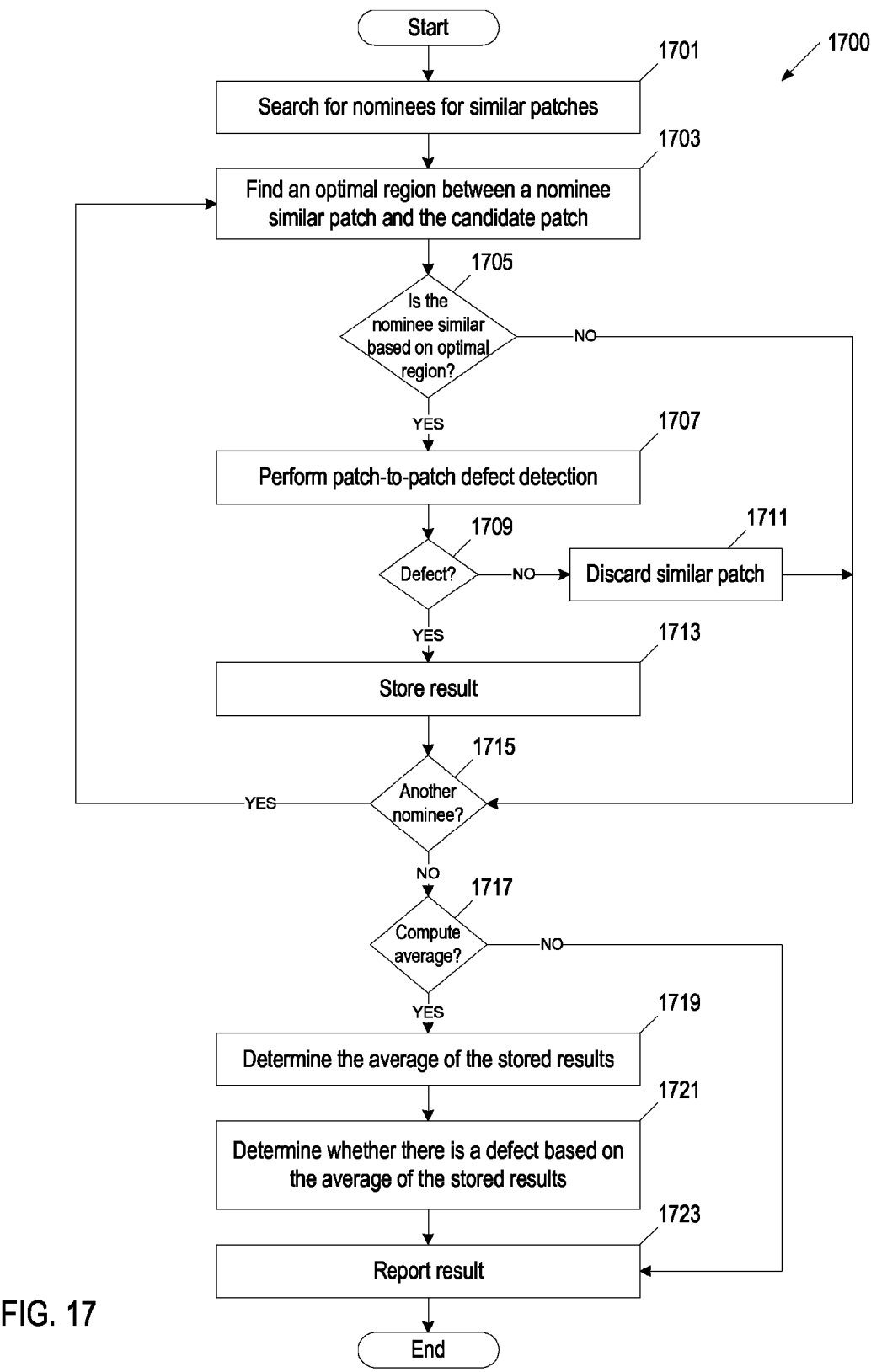
FIG. 17 is a flow diagram of an embodiment of a method for detecting defects by comparing similar patches within a transmitted image.

FIG. 17 is a flow diagram of an embodiment of a method 1700 for detecting defects by comparing similar patches within a transmitted image. Method 1700 can be performed by processing logic that can comprise hardware (e.g., circuitry, dedicated logic, programmable logic, microcode, etc.), software (e.g., instructions run on a processing device), or a combination thereof. In one embodiment, method 1700 is performed by a patch-to-patch defect detection module 107 of FIG. 1.

At block 1701, according to some embodiments, for each candidate defect location, processing logic searches for nominees for similar patches. It is appreciated that the candidate defect location may be a defect and therefore, using a large area around it for reliable pattern matching (e.g., MAD-based) is advantageous. At block 1703, processing logic finds an optimal region between a nominee similar patch and the candidate patch. An optimal region can contain only similar pixels. An optimal region can be any shape, such as, and not limited to, a rectangle, a circular shape, a square, or any arbitrary shape. One embodiment for finding an optimal region is described in greater detail below in conjunction with FIG. 20.

At block 1705, processing logic determines whether the nominee similar patch is similar to the candidate patch based on the optimal region. Processing logic can determine whether a legal region (e.g., rectangle) was found. A legal region can include a region that satisfies criteria, such as having a minimal area (e.g., 200 pixels) and having a minimum number of pixels in each axis (e.g., 7 pixels). If a legal region was found (block 1705), processing logic determines that the nominee similar patch is similar to the candidate patch (in the area of the optimal region) and performs patch-to-patch defect detection at block 1707. If a legal region is not found (block 1705), processing logic determines that the nominee similar patch is not similar to the candidate patch and determines whether there is another nominee similar patch to process at block 1715.

At block 1707, processing logic performs patch-to-patch defect detection to determine whether there is a defect at the candidate defect location. One embodiment of performing patch-to-patch defect detection to determine whether there is a defect at the candidate defect location is described in greater detail below in conjunction with FIG. 21, If there is not a defect (block 1709), processing logic discards the similar patch at block 1711. Processing logic can determine there is not a defect if the signal to noise ratio (SNR) falls below a threshold. The threshold can be selected to ensure that if a difference signal falls below the threshold, the candidate is not a defect. For example, the threshold may be set by a user according to the smallest defect she/he expects to find (e.g., approximately 2-3 SNR). The discarded similar patch can represent a false alarm in the sense that comparing the candidate patch to the current similar patch yielded a very low difference signal. Processing logic can record data indicating the similar patch is a false alarm. If there is a defect (block 1709), processing logic stores the defect result data in a data store that is coupled to the patch-to-patch defect detection module at block 1713.

At block 1715, processing logic determines whether there is another nominee similar patch. If there is another nominee similar patch, processing logic returns to block 1703 to find an optimal region between the next nominee similar patch and the candidate patch. If there is not another nominee similar patch to evaluate (block 1715), processing logic determines whether there is sufficient stored results to compute an average at block 1717. In one embodiment, processing logic computes an average of the stored results if there are stored results for more than two similar patches. If an average cannot be computed (block 1717), processing logic reports the result at block 1723. Processing logic can record data and/or report data indicating that the candidate defect location corresponding to the candidate patch is unresolved.

If an average can be computed (block 1717), processing logic computes the average of the stored results at block 1719 and determines whether there is a defect at the candidate defect location that corresponds to the candidate patch based on the average at block 1721. One embodiment of determining whether there is a defect at the candidate defect location that corresponds to the candidate patch based on the average is described in greater detail above in conjunction with FIG. 12.

At block 1723, processing logic reports the results of the determination. For example, if there is a defect at the candidate defect location that corresponds to the candidate patch based on the average, processing logic can record data and/or report data indicating there is a defect. If there is not a defect at the candidate defect location that corresponds to the candidate patch based on the average, processing logic can record data and/or report data indicating there is a false alarm.

Figure 18:
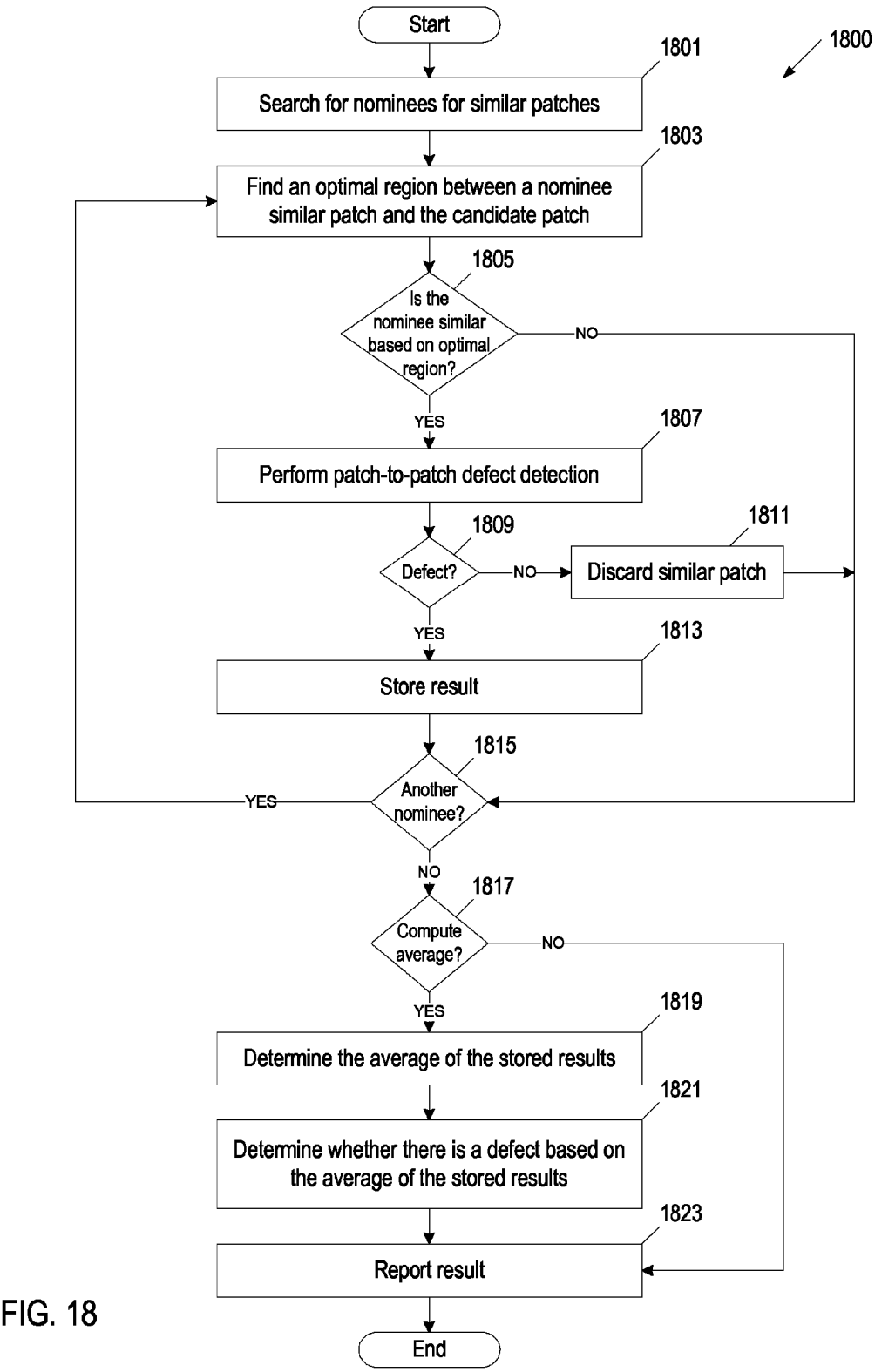
FIG. 18 is a flow diagram of an embodiment of a method for detecting defects by comparing similar patches within a reflected image.

FIG. 18 is a flow diagram of an embodiment of a method 1800 for detecting defects by comparing similar patches within a reflected image. Method 1800 can be performed by processing logic that can comprise hardware (e.g., circuitry, dedicated logic, programmable logic, microcode, etc.), software (e.g., instructions run on a processing device), or a combination thereof. In one embodiment, method 1800 is performed by a patch-to-patch defect detection module 107 of FIG. 1.

At block 1801, according to some embodiments, for each candidate defect location, processing logic searches for nominees for similar patches. It is appreciated that the candidate defect location may be a defect and therefore, using a large area around it for reliable pattern matching (e.g., MAD-based) is advantageous. At block 1803, processing logic finds an optimal region between a nominee similar patch and the candidate patch. One embodiment for finding an optimal region is described in greater detail below in conjunction with FIG. 20.

At block 1805, processing logic determines whether the nominee similar patch is similar to the candidate patch based on the optimal region. Processing logic can determine whether a legal region (e.g., rectangle) was found. If a legal region was found (block 1805), processing logic determines that the nominee similar patch is similar to the candidate patch (in the area of the optimal region) and performs patch-to-patch defect detection at block 1807. If a legal region is not found (block 1805), processing logic determines that the nominee similar patch is not similar to the candidate patch and determines whether there is another nominee similar patch to process at block 1815.

At block 1807, processing logic performs patch-to-patch defect detection to determine whether there is a defect at the candidate defect location. One embodiment of performing patch-to-patch defect detection to determine whether there is a defect at the candidate defect location is described in greater detail below in conjunction with FIG. 21, If there is not a defect (block 1809), processing logic discards the similar patch at block 1811. Processing logic can determine there is not a defect if the signal to noise ratio (SNR) falls below a threshold. The threshold can be selected to ensure that if a difference signal falls below the threshold, the candidate is not a defect. For example, the threshold may be set by a user according to the smallest defect she/he expects to find (e.g., approximately 2-3 SNR). The discarded similar patch can represent a false alarm in the sense that comparing the candidate patch to the current similar patch yielded a very low difference signal. Processing logic can record data indicating the similar patch is a false alarm. If there is a defect (block 1809), processing logic stores the defect result data in a data store that is coupled to the patch-to-patch defect detection module at block 1813.

At block 1815, processing logic determines whether there is another nominee similar patch. If there is another nominee similar patch, processing logic returns to block 1803 to find an optimal region between the next nominee similar patch and the candidate patch. If there is not another nominee similar patch to evaluate (block 1815), processing logic determines whether there is sufficient stored results to compute an average at block 1817. In one embodiment, processing logic computes an average of the stored results if there are stored results for more than two similar patches. If an average cannot be computed (block 1817), processing logic reports the result at block 1823. Processing logic can record data and/or report data indicating that the candidate defect location corresponding to the candidate patch is unresolved.

If an average can be computed (block 1817), processing logic computes the average of the stored results at block 1819 and determines whether there is a defect at the candidate defect location that corresponds to the candidate patch based on the average at block 1821. One embodiment of determining whether there is a defect at the candidate defect location that corresponds to the candidate patch based on the average is described in greater detail above in conjunction with FIG. 12.

At block 1823, processing logic reports the results of the determination. For example, if there is a defect at the candidate defect location that corresponds to the candidate patch based on the average, processing logic can record data and/or report data indicating there is a defect. If there is not a defect at the candidate defect location that corresponds to the candidate patch based on the average, processing logic can record data and/or report data indicating there is a false alarm.

Figure 19:
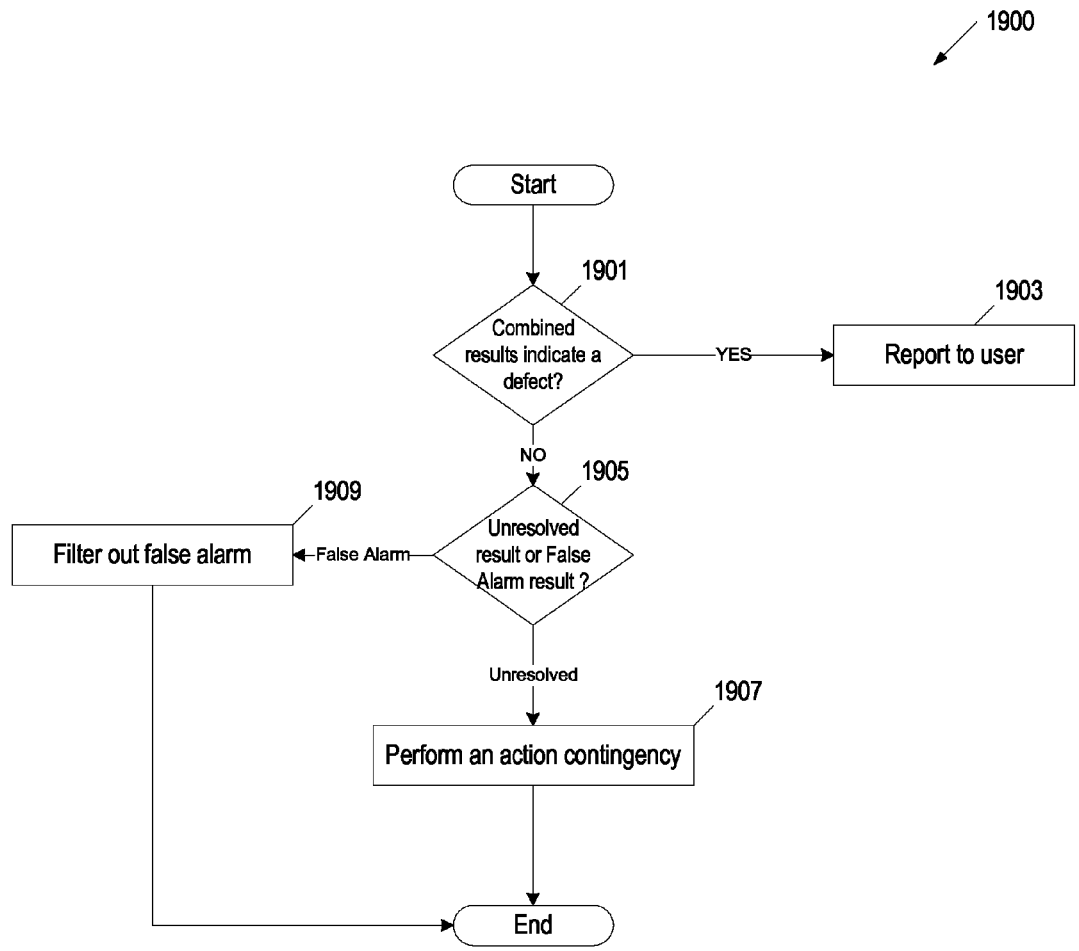
FIG. 19 is a flow diagram of an embodiment of a method for combining results of a transmitted image and a reflected image to determine whether there is a defect.

FIG. 19 is a flow diagram of an embodiment of a method 1900 for combining results of a transmitted image and a reflected image to determine whether there is a defect. Method 1900 can be performed by processing logic that can comprise hardware (e.g., circuitry, dedicated logic, programmable logic, microcode, etc.), software (e.g., instructions run on a processing device), or a combination thereof. In one embodiment, method 1900 is performed by a patch-to-patch defect detection module 107 of FIG. 1.

At block 1901, processing logic determines whether the combined results indicate a defect. If a transmitted image result or a reflected image result indicates a defect, processing logic determines there is a defect. If both a transmitted image result and a reflected image result indicate a false alarm, processing logic determines there is not defect, but a false alarm. If both a transmitted image result and a reflected image result indicate unresolved results, processing logic determines there is not defect, but an unresolved result.

If there is a defect (block 1901), processing logic reports the defect to a user at block 1903. If there is not a defect (block 1901), processing logic determines whether the result is a false alarm or an unresolved result at block 1905. When processing logic arrives at a decision of "unresolved" or "false alarm" (block 1901), processing logic does not report that candidate defect location to the user. A "Defect", in contrast, is reported to the user at block 1903.

At block 1905, processing logic determines whether the result is a false alarm or an unresolved result. If the result is unresolved (block 1905), processing logic performs one or more other action contingencies. For example, in the event of "unresolved" decisions, whether the transmitted image being unresolved or the reflected image being unresolved or both, processing logic may search for similar patches beyond the current frame. Processing logic may search for similar patches in neighboring frames or even in non-neighboring frames, until a similar patch is found. In another example, processing logic may automatically revert to detection processes, such as, but not limited to D2D, D2M, and/or light-based image defect detection.

If the result is a false alarm (block 1905), processing logic applies a filter. For example, if the method assumes a defect if there are 2 patches in the frame which are similar outside the hole and different inside the hole, this may yield false alarms if this assumption is not correct. For example, if for a real pattern on the mask, 2 patches are similar outside a certain (non-defect) feature but different on that feature. At block 1905, processing logic may filter the false alarms as follows:

In one embodiment, after detecting an event (e.g., defect) as described herein, processing logic applies suitable logic to look at the sign of the difference signal in the transmitted image and the reflected image and decides whether to report the event as a defect or to filter it out. The logic is selected based on previous knowledge defining different behavior of pattern false alarms (FAs) as opposed to various types of defects.

In another embodiment, processing logic gathers all events (e.g., defects) reported by the defect detection method shown and described herein, and then filters on the entire mask level, since events (e.g., defects) that are repetitive over the entire mask are probably not defects and can be filtered out.

In another embodiment, processing logic performs a combination filtering techniques.

Figure 20:
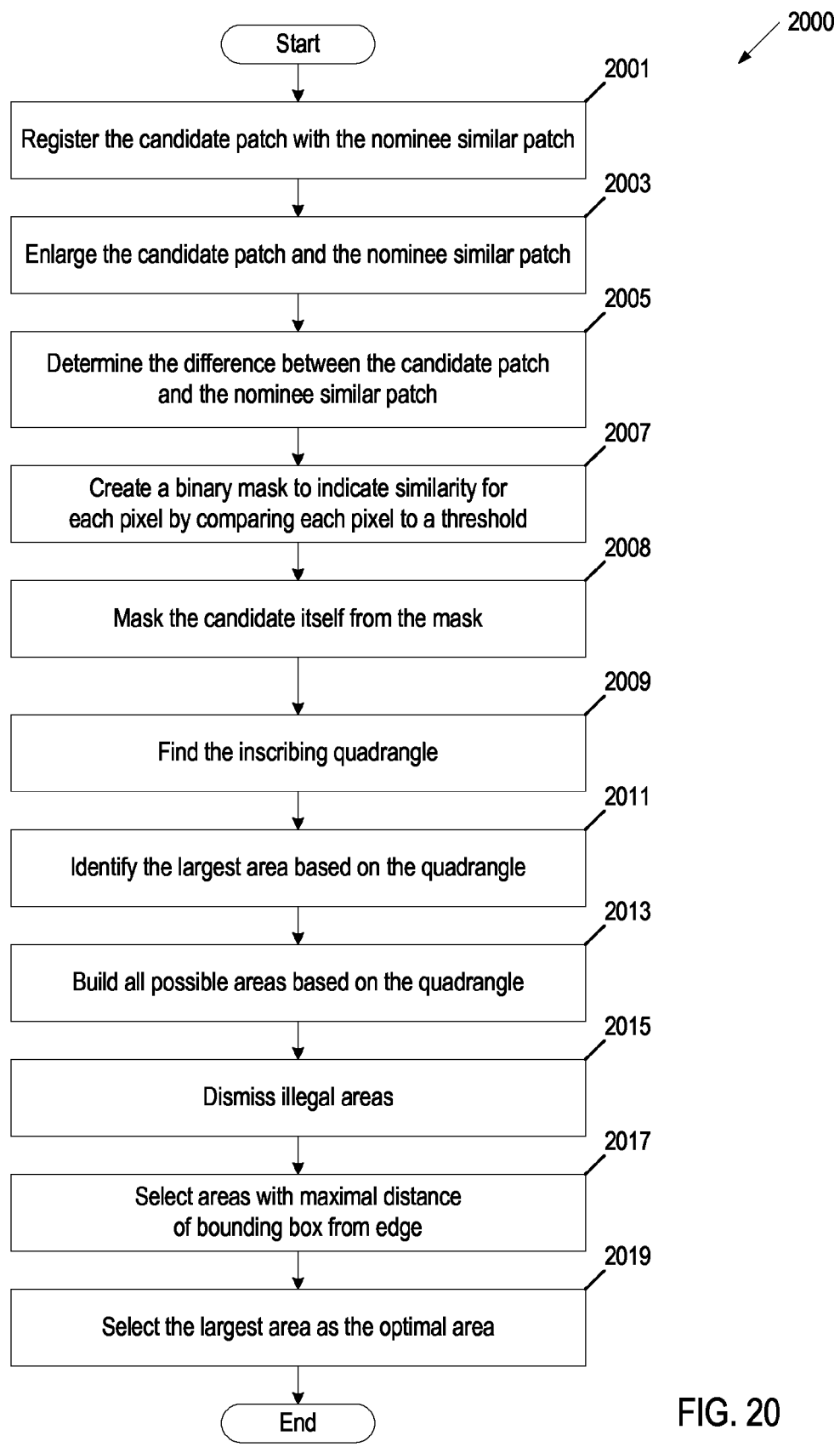
FIG. 20 is a flow diagram of an embodiment of a method for finding an optimal region between a nominee similar patch and the candidate patch for light-based imaging defect detection.

FIG. 20 is a flow diagram of an embodiment of a method 2000 for finding an optimal region between a nominee similar patch and the candidate patch for light-based imaging defect detection. Method 2000 can be performed by processing logic that can comprise hardware (e.g., circuitry, dedicated logic, programmable logic, microcode, etc.), software (e.g., instructions run on a processing device), or a combination thereof. In one embodiment, method 2000 is performed by a patch-to-patch defect detection module 107 of FIG. 1.

At block 2001, processing logic registers the candidate patch with a nominee similar patch. One embodiment for registering a candidate patch with a nominee similar patch is described in greater detail above in conjunction with FIG. 14. At block 2003, processing logic enlarges the candidate patch and the nominee similar patch to a larger patch. At block 2005, processing logic computes the difference between the candidate patch and the nominee similar patch.

At block 2007, processing logic creates a binary mask (similarity mask) indicating a similarity for each pixel by comparing each pixel to a threshold. The similarity mask is set to true for a pixel which is similar (e.g., the absolute difference is below a threshold) between the enlarged candidate patch and the nominee similar patch. At block 2008, processing logic masks the candidate itself from the mask. For example, processing logic sets the similarity mask to be true for all pixels that compose (fall within) the candidate. According to this embodiment, it is assumed that the candidate must be masked, since there is no reference. It is assumed that all pixels in the candidate bounding box are similar, unlike in the D2D/D2M embodiment of FIG. 10. Instead of performing the method of FIG. 10 as is, a similar patch is searched for, disregarding the candidate. If a similar patch is found, assume patches are similar also in the candidate's pixels and perform detection there by comparing the current patch and the (each) similar patch found, thereby providing a de-facto light-based image Processing logic can mask out candidate's bounding box, also termed herein a "hole". Since processing logic has found a rectangle with similar pixels outside the hole, pixels inside the hole should be similar.

At block 2009, processing logic finds the quadrangle that inscribes only pixels that were tagged as similar. At block 2011, processing logic identifies the largest area (e.g., rectangle) that necessarily touches two opposite sides of the quadrangle found. Examples of an area can include, and are not limited to, a rectangle, a square, a circular shape, and an arbitrary shape. Processing logic may save time in finding the largest area (e.g., rectangle) by checking only the areas (e.g., rectangles) that satisfy the property of touching two opposites sides of the quadrangle instead of checking all possible areas (e.g., rectangles). At block 2013, processing logic builds all possible areas (e.g., rectangles) which have two opposite corners touching two opposite sides of the quadrangle. At block 21015, processing logic dismisses illegal areas (e.g., illegal rectangles). Illegal areas can include areas that do not satisfy criteria, such as having a minimal area (e.g., 200 pixels) and having a minimum number of pixels in each axis (e.g., 7 pixels). At block 2017, for each area (e.g., rectangle), processing logic finds the minimal distance between the candidates bounding box and each edge (e.g., side) of the area (e.g., rectangle) and selects areas (e.g., rectangles) for which distance of hole from edge is maximal. At block 2019, processing logic identifies the largest of the selected areas (e.g., rectangles) as the optimal area (e.g., rectangle). The optimal area (e.g., rectangle) contains only similar pixels.

In light-based imaging defect detection, the evidence for similarity in the hole may be maximized, by ensuring that the distance of the candidate's bounding box ("hole") from the edge of the patch is maximal up to a certain limit beyond which there is no preference. In light-based imaging defect detection, legality of a rectangle typically also includes a minimal distance of the hole from the closest edge of the rectangle. The minimum value can be determined empirically to ensure that it does not yield false alarms, typical values being 2-3 pixels.

Figure 21:
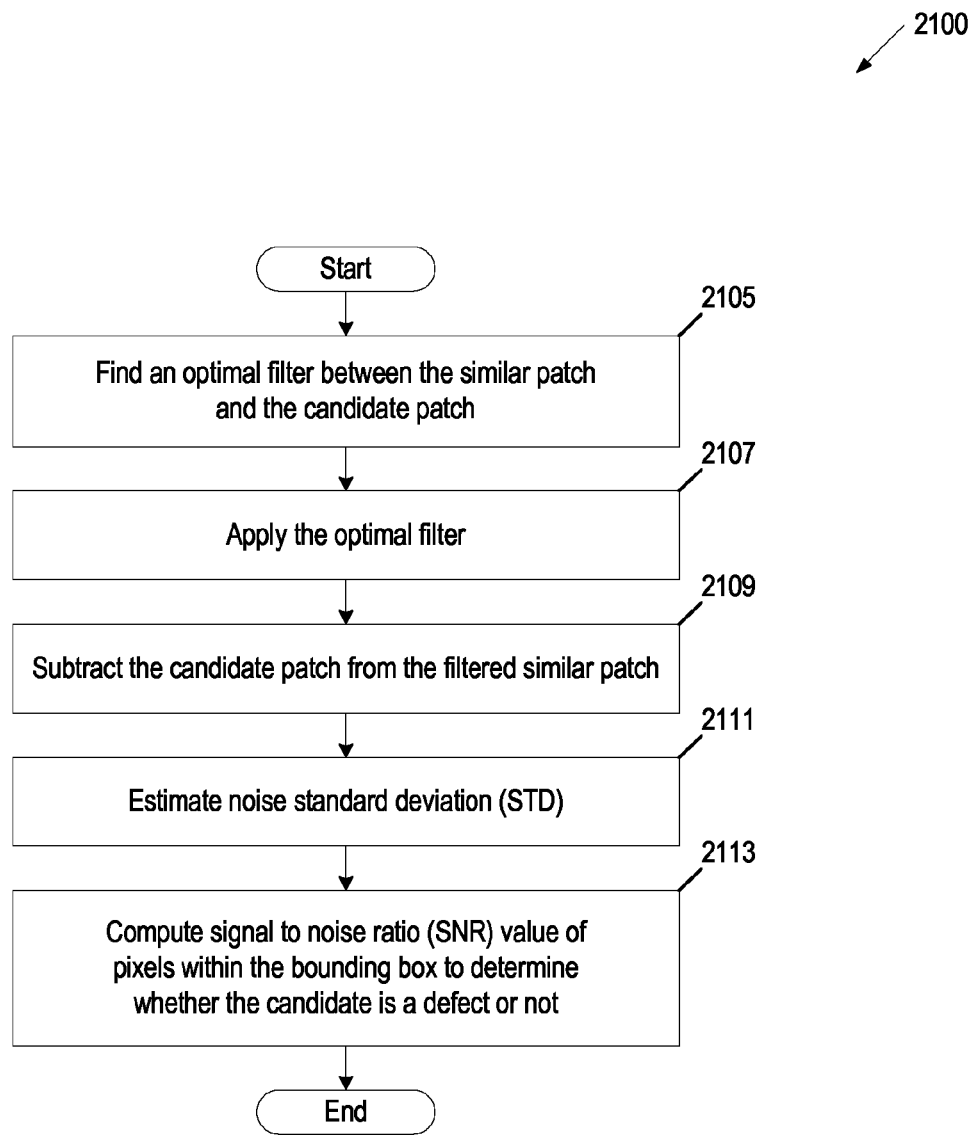
FIG. 21 is a flow diagram of an embodiment of a method for performing patch-to-patch defect detection to determine whether there is a defect at the candidate defect location.

FIG. 21 is a flow diagram of an embodiment of a method 2100 for performing patch-to-patch defect detection to determine whether there is a defect at the candidate defect location. Method 2100 can be performed by processing logic that can comprise hardware (e.g., circuitry, dedicated logic, programmable logic, microcode, etc.), software (e.g., instructions run on a processing device), or a combination thereof. In one embodiment, method 2100 is performed by a patch-to-patch defect detection module 107 of FIG. 1.

It is appreciated that non-similar regions are masked out and patches are already registered. At block 2105, processing logic finds an optimal filter between the similar patch and candidate's patch. One embodiment of finding an optimal filter is described in greater detail above in conjunction with FIG. 11. At block 2107, processing logic applies the optimal filter on the similar patch. At block 2109, processing logic subtracts the candidate patch from the filtered similar patch including masking out the filter margins. At block 2111, processing logic estimates noise standard deviation (STD). In one embodiment, processing logic estimates noise STD directly by computing STD of out-of-bounding-box pixels. In another embodiment, the noise STD may be provided by a pre-learned LUT (look-up-table) for noise estimation that is generated by offline learning of the noise behavior in a set-up stage. At block 2113, processing logic computes a signal to noise ratio (SNR) value of pixels within the bounding box. For example, processing logic may use SNR=Diff(GL)/noise STD to determine whether the candidate defect location has a defect, where GL is gray level. instead of looking at the candidate SNR, processing logic uses other attributes, such as, but not limited to, any or all of regular GL (gray level) difference, energy, size, shape, in order to determine whether the candidate defect location is a defect or not.

It is appreciated that the method of FIGS. 8, 17 and 18 are merely exemplary. If a candidate is similar to another patch in the frame, for example, in that the difference signal is so extremely low that two patches are actually the same, the method typically decides on the spot that this is not a defect. In this stage a very low threshold is typically used so only candidates with really very low signals are dismissed since it is clear that they are not defects. Regarding all other candidates, where there is doubt, the method continues to all other similar patches and bases a final decision on an averaged signal which is relatively noise-less. This embodiment is suitable for applications in which throughput considerations are important because dismissing candidates as soon as they are found to be very similar to other patches allows the method to skip other nominees and, often, save many operations for these dismissed candidates.

In applications in which throughput is less important, all nominees may be considered and all similar patches may be averaged. The illustrated methods can be degenerated to this embodiment by setting the intermediate very low threshold described above to be 0 such that no candidate is dismissed and all candidates reach the averaging stage.

Alternatively, even if a candidate defect is similar to a nominee, it is not immediately declared to be a false alarm. Instead, this similarity information is averaged with information re other nominees. Alternatively, if a candidate defect is different from a (one or more) nominee, it is declared a defect, and otherwise, the non-defect information is averaged with information re other nominees.

Figure 22:
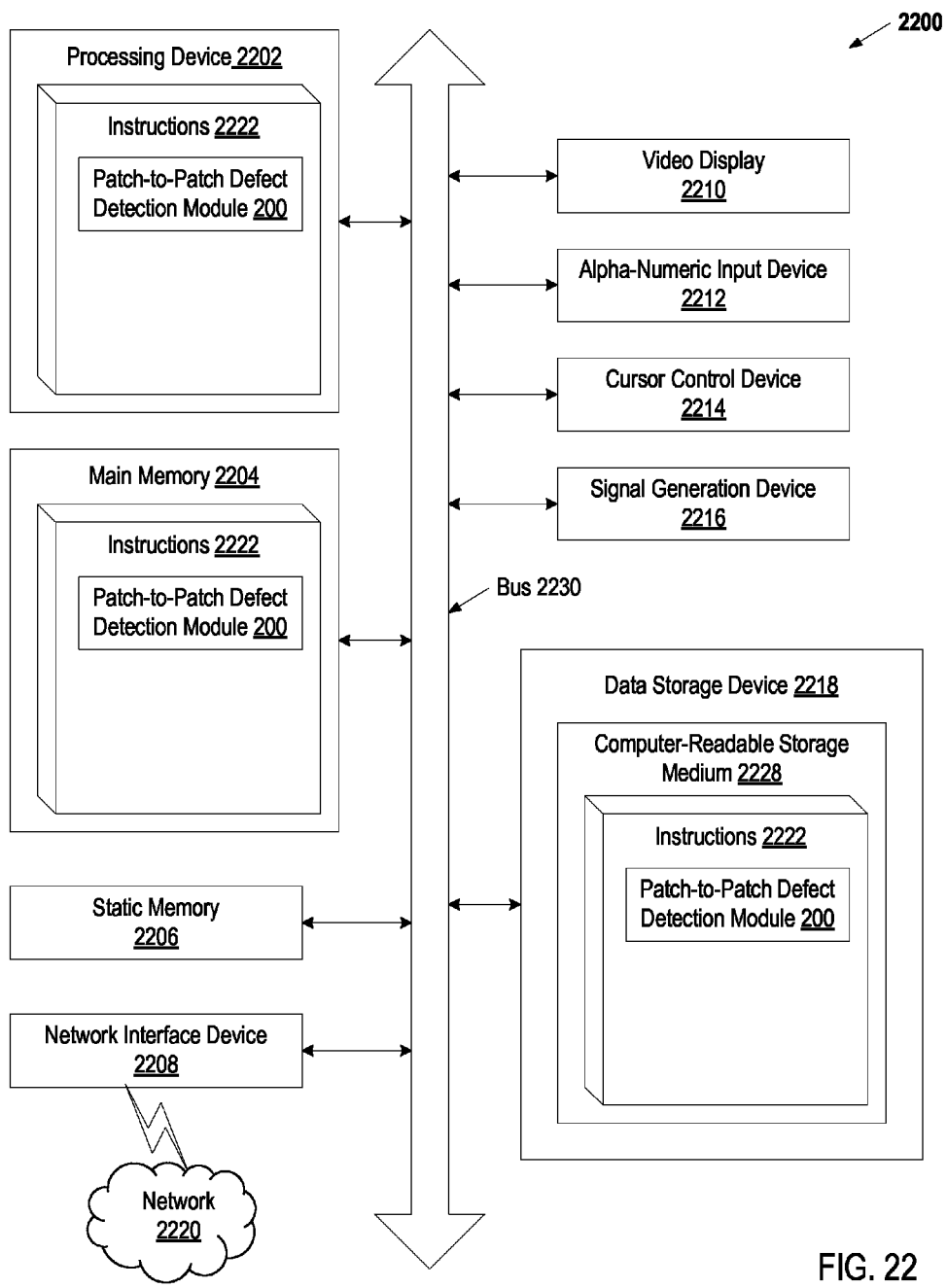
FIG. 22 is a diagram of one embodiment of a computer system that may perform one or more of the operations described herein.

FIG. 22 illustrates a diagram of a machine in the exemplary form of a computer system 2200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be hosted by or integrated with an article inspection system, or be connected to such a system directly or via an intermediate system. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 2200 includes a processing device (processor) 2202, a main memory 2204 (e.g., read-only memory (ROM), flash memory, dynamic random access memory (DRAM) such as synchronous DRAM (SDRAM), double data rate (DDR SDRAM), or DRAM (RDRAM), etc.), a static memory 2206 (e.g., flash memory, static random access memory (SRAM), etc.), and a data storage device 2218, which communicate with each other via a bus 2230.

Processor 2202 represents one or more general-purpose processing devices such as a microprocessor, central processing unit, or the like. More particularly, the processor 2202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 2202 may also be one or more special-purpose processing devices such as an application specific integrated circuit (ASIC), a field programmable gate array (FPGA), a digital signal processor (DSP), network processor, or the like. The processor 2202 is configured to execute instructions 2222 for performing the operations and steps discussed herein.

The computer system 2200 may further include a network interface device 2208. The computer system 2200 also may include a video display unit 2210 (e.g., a liquid crystal display (LCD) or a cathode ray tube (CRT)), an alphanumeric input device 2212 (e.g., a keyboard), a cursor control device 2214 (e.g., a mouse), and a signal generation device 2216 (e.g., a speaker).

The data storage device 2218 may include a computer-readable storage medium 2228 on which is stored one or more sets of instructions 2222 (e.g., software) embodying any one or more of the methodologies or functions described herein. The instructions 2222 may also reside, completely or at least partially, within the main memory 2204 and/or within the processor 2202 during execution thereof by the computer system 2400, the main memory 2204 and the processor 2202 also constituting computer-readable storage media. The instructions 2222 may further be transmitted or received over a network 2220 via the network interface device 2208.

In one embodiment, the instructions 2222 include instructions for a patch-to-patch defect detection module (e.g., patch-to-patch defect detection module 200 of FIG. 2) and/or a software library containing methods that call the patch-to-patch defect detection module. While the computer-readable storage medium 2228 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "defining," "identifying," "determining," "selecting," "associating," "comparing," "excluding," "collecting," "averaging," "adapting," "providing," "applying," "aligning," "subtracting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

receiving, based on processing of an inspected frame of an inspected image generated by collecting signals indicative of a pattern on an article, at least one candidate defect location in the inspected frame;

defining a candidate patch within the inspected frame, the candidate patch being associated with the candidate defect location;

selecting a reference patch in a reference frame, wherein the selecting is based on another reference patch that corresponds to the candidate patch in the inspected frame;

identifying at least one similar patch within the same inspected frame of the inspected image that is similar to the candidate patch in the inspected frame using the reference patch in the reference frame; and determining, by a computer system, whether a defect exists at the candidate defect location based on a comparison of at least a portion of the candidate patch in the inspected frame with at least a corresponding portion of the at least one similar patch that is within the same inspected frame.

2. The method of claim 1, wherein selecting the reference patch comprises:
receiving the reference frame of a reference image;
defining the other reference patch within the reference frame, the other reference patch being associated with a first reference location in the reference frame that corresponds to the candidate defect location in the inspected frame; and
selecting the reference patch of the reference image within the reference frame using a reference similarity criterion and associating a second reference location to the second reference patch,
wherein identifying the similar patch within the same inspected frame comprises associating the second reference location with a corresponding second location in the inspected frame and identifying a patch associated with the second location in the inspected frame as the similar patch in the inspected frame.

3. The method of claim 1, wherein identifying at least one similar patch comprises:
excluding one or more pixels in a comparison between the candidate patch in the inspected frame and the similar patch within the same inspected frame of the inspected image, the one or more pixels being associated with the candidate defect location.

4. The method of claim 1, wherein identifying at least one similar patch comprises:
identifying one or more similar patches using a statistical model.

5. The method of claim 1, wherein determining whether the defect exists comprises:
comparing at least the portion of the candidate patch in the inspected frame to at least the corresponding portion of each of the at least one similar patch that is within the same inspected frame to obtain a plurality of comparison results; and
averaging the plurality of comparison results to determine whether there is the defect.

6. The method of claim 1, further comprising:
adapting at least one characteristic of the at least one similar patch to define at least one second similar patch which corresponds to a modified candidate patch comprising the candidate defect, wherein a similarity of the at least one second similar patch to the modified candidate patch exceeds the similarity between the at least one similar patch and the unmodified candidate patch; and
comparing at least a portion of the modified candidate patch to a corresponding portion of the at least one second similar patch.

7. The method of claim 6, wherein the at least one characteristic comprises a length of at least one dimension of the at least one similar patch.

8. The method of claim 6, wherein the at least one characteristic comprises a relative positioning between the candidate defect and the candidate patch containing the candidate defect.

9. The method of claim 1, wherein determining whether the defect exists comprises:
providing an optimal filter which, when applied to the at least one similar patch, is operative to decrease differences between the at least one similar patch and a defect-less candidate patch; and
applying the optimal filter to the at least one similar patch before comparing at least the portion of the candidate patch to at least the corresponding portion of the at least one similar patch to determine whether there is the defect.

10. The method of claim 9, wherein comparing at least the portion of the candidate patch to at least the corresponding portion of the at least one similar patch comprises:
aligning the candidate patch to the at least one similar patch;
applying of the optimal filter; and
subtracting respective pixels of the aligned candidate patch from respective pixels of the filtered aligned similar patch to determine whether there is a defect.

11. A system comprising:
a memory;
a processing device coupled to the memory to:
receive, based on processing of an inspected frame of an inspected image generated by collecting signals indicative of a pattern on an article,
at least one candidate defect location in the inspected frame;
define a candidate patch within the inspected frame, the candidate patch being associated with the candidate defect location;
select a reference patch in a reference frame, wherein the selecting is based on another reference patch that corresponds to the candidate patch in the inspected frame;
identify at least one similar patch within the same inspected frame of the inspected image that is similar to the candidate patch in the inspected frame using the reference patch in the reference frame; and
determine whether a defect exists at the candidate defect location based on a comparison of at least a portion of the candidate patch in the inspected frame with at least a corresponding portion of the at least one similar patch that is within the same inspected frame.

12. The system of claim 11, wherein the processing device is to select the reference patch by:
receiving the reference frame of a reference image;
defining the other reference patch within the reference frame, the other reference patch being associated with a first reference location in the reference frame that corresponds to the candidate defect location in the inspected frame; and
selecting the reference patch of the reference image within the reference frame using a reference similarity criterion and associating a second reference location to the second reference patch,
wherein the processing device is to identify the similar patch within the same inspected frame by associating the second reference location with a corresponding second location in the inspected frame and identifying a patch associated with the second location in the inspected frame as the similar patch in the inspected frame.

13. The system of claim 11, wherein the processing device is to identify at least one similar patch by:
excluding one or more pixels in a comparison between the candidate patch in the inspected frame and the similar patch within the same inspected frame of the inspected image, the one or more pixels being associated with the candidate defect location.

14. The system of claim 11, wherein the processing device is to identify at least one similar patch by:
identifying one or more similar patches using a statistical model.

15. The system of claim 11, wherein the processing device is to determine the defect exists by:
- comparing at least the portion of the candidate patch in the inspected frame to at least the corresponding portion of each of the at least one similar patch that is within the same inspected frame to obtain a plurality of comparison results; and
- averaging the plurality of comparison results to determine whether there is the defect.

16. The system of claim 11, wherein the processing device is further to:
- adapt at least one characteristic of the at least one similar patch to define at least one second similar patch which corresponds to a modified candidate patch comprising the candidate defect, wherein a similarity of the at least one second similar patch to the modified candidate patch exceeds the similarity between the at least one similar patch and the unmodified candidate patch; and
- compare at least a portion of the modified candidate patch to a corresponding portion of the at least one second similar patch, wherein the at least one characteristic comprises at least one of a length of at least one dimension of the at least one similar patch or a relative positioning between the candidate defect and the candidate patch containing the candidate defect.

17. A non-transitory computer readable storage medium including instructions that, when executed by a processing device, cause the processing device to perform operations comprising:
- receiving, based on processing of an inspected frame of an inspected image generated by collecting signals indicative of a pattern on an article, at least one candidate defect location in the inspected frame;
- defining a candidate patch within the inspected frame, the candidate patch being associated with the candidate defect location;
- selecting a reference patch in a reference frame, wherein the selecting is based on another reference patch that corresponds to the candidate patch in the inspected frame;
- identifying at least one similar patch within the same inspected frame of the inspected image that is similar to the candidate patch in the inspected frame using the reference patch in the reference frame; and
- determining, by the processing device, whether a defect exists at the candidate defect location based on a comparison of at least a portion of the candidate patch in the inspected frame with at least a corresponding portion of the at least one similar patch that is within the same inspected frame.

18. The non-transitory computer readable storage medium of claim 17, wherein selecting the reference patch comprises:
- receiving the reference frame of a reference image;
- defining the other reference patch within the reference frame, the other reference patch being associated with a first reference location in the reference frame that corresponds to the candidate defect location in the inspected frame; and
- selecting the reference patch of the reference image within the reference frame using a reference similarity criterion and associating a second reference location to the second reference patch,
- wherein identifying the similar patch within the same inspected frame comprises associating the second reference location with a corresponding second location in the inspected frame and identifying a patch associated with the second location in the inspected frame as the similar patch in the inspected frame.

19. The non-transitory computer readable storage medium of claim 17, wherein identifying at least one similar patch comprises:
- excluding one or more pixels in a comparison between the candidate patch in the inspected frame and the similar patch within the same inspected frame of the inspected image, the one or more pixels being associated with the candidate defect location.

20. The non-transitory computer readable storage medium of claim 17, wherein identifying at least one similar patch comprises:
- identifying one or more similar patches using a statistical model.

* * * * *